US008102243B2

(12) United States Patent
Horne et al.

(10) Patent No.: US 8,102,243 B2
(45) Date of Patent: Jan. 24, 2012

(54) RFID PROTECTION DEVICE, AND RELATED METHODS

(75) Inventors: Gregory L. Horne, Argyle, TX (US); James C. Adams, Burleson, TX (US)

(73) Assignee: Curio Ltd., Fort Worth, TX (US)

( * ) Notice: Subject to any disclaimer, the term of this patent is extended or adjusted under 35 U.S.C. 154(b) by 356 days.

(21) Appl. No.: 12/406,744

(22) Filed: Mar. 18, 2009

(65) Prior Publication Data

US 2009/0174556 A1 Jul. 9, 2009

Related U.S. Application Data

(63) Continuation-in-part of application No. 11/581,896, filed on Oct. 17, 2006, now Pat. No. 7,889,056.

(60) Provisional application No. 60/731,750, filed on Oct. 31, 2005.

(51) Int. Cl.
*H04Q 5/22* (2006.01)

(52) U.S. Cl. .............. 340/10.1; 340/572.1; 340/568.7; 340/572.3; 455/1; 455/41.1; 455/456.1; 455/421

(58) Field of Classification Search .............. 340/572.8, 340/10.1, 568.7, 572.1, 572.3, 5.2; 250/515.1; 455/1, 41.1, 229, 410, 421, 456.1–456.6
See application file for complete search history.

(56) References Cited

U.S. PATENT DOCUMENTS

| 4,631,708 A * | 12/1986 | Wood et al. .............. 367/2 |
| 4,931,788 A | 6/1990 | Creswick |
| 5,083,111 A * | 1/1992 | Drucker et al. ............ 340/572.1 |
| 5,847,662 A * | 12/1998 | Yokota et al. .............. 340/10.34 |
| 6,121,544 A | 9/2000 | Petsinger |
| 6,195,529 B1 * | 2/2001 | Linz et al. ............... 455/1 |
| 6,473,031 B1 * | 10/2002 | Harris ................. 342/357.51 |
| 6,580,432 B1 | 6/2003 | Leung et al. |
| 6,687,506 B1 * | 2/2004 | Girod ................ 455/456.4 |
| 6,892,052 B2 * | 5/2005 | Kotola et al. ............ 455/41.2 |
| 6,925,287 B2 * | 8/2005 | Davie et al. ............. 455/41.1 |
| 6,970,070 B2 | 11/2005 | Juels et al. |
| 7,075,437 B2 * | 7/2006 | Bridgelall et al. ......... 340/572.1 |
| 7,083,083 B2 | 8/2006 | Droz |
| 7,088,248 B2 * | 8/2006 | Forster .............. 340/572.7 |
| 7,103,310 B2 * | 9/2006 | Lucidarme et al. ........... 455/1 |
| 7,221,900 B2 * | 5/2007 | Reade et al. ............ 455/1 |
| 7,289,761 B2 * | 10/2007 | Mazar .................. 455/1 |

(Continued)

OTHER PUBLICATIONS

Notice of Allowability for co-pending U.S. Appl. No. 11/581,896.
International Search Report and Written Opinion for co-pending PCT application PCT/US10/27845 dated May 27, 2010.
M Wright, article "Contactless Traveling," dated Jul. 7, 2005, found at http://www.edn.com/index.asp?layout=articlePrint&articleID=CA621643.

(Continued)

*Primary Examiner* — Daniel Wu
*Assistant Examiner* — Ryan Sherwin
(74) *Attorney, Agent, or Firm* — Bracewell & Giuliani LLP

(57) ABSTRACT

Devices and methods of preventing data transfer between an RFID reader and an RFID device to be protected, are provided. An example of an embodiment of an RFID signal capture device includes a container, a signal capture circuit configured to substantially disrupt the signal provided by the RFID reader when the RFID signal capture device is positioned to protect the RFID device, and an interrogation indictor configured to indicate to a user of the RFID device that an unauthorized RFID reader is attempting to interrogate the RFID device when the RFID signal capture device is positioned in close proximity to the RFID device to provide protection thereto and when the RFID reader is producing the interrogation signal.

39 Claims, 19 Drawing Sheets

U.S. PATENT DOCUMENTS

| | | |
|---|---|---|
| 7,298,243 B2 | 11/2007 | Juels et al. |
| 7,336,186 B2 * | 2/2008 | Noguchi .................... 340/572.8 |
| 7,522,905 B2 | 4/2009 | Hammad et al. |
| 7,671,741 B2 * | 3/2010 | Lax et al. .................... 340/572.1 |
| 2003/0143943 A1 * | 7/2003 | Kline ................................ 455/1 |
| 2004/0222878 A1 | 11/2004 | Juels |
| 2004/0223481 A1 * | 11/2004 | Juels et al. .................... 370/345 |
| 2006/0286938 A1 * | 12/2006 | Murdoch ........................ 455/73 |
| 2007/0289775 A1 | 12/2007 | Potts et al. |
| 2008/0256642 A1 | 10/2008 | Hachey |
| 2008/0303632 A1 | 12/2008 | Hammad |
| 2009/0021343 A1 | 1/2009 | Sinha |

OTHER PUBLICATIONS

K Zetter, article "Jamming Tags Block RFID Scanners," dated Mar. 1, 2004, found at www.wired.com/news/print/01294,62468,00.html.

Office Action in co-pending U.S. Appl. No. 12/985,002 dated May 26, 2011.

International Preliminary Examination Report in co-pending application serial No. PCT/US10/27845 dated Aug. 17, 2011.

International Preliminary Report on Patentability in co-pending application serial No. PCT/US10/27845 dated Sep. 29, 2011.

* cited by examiner

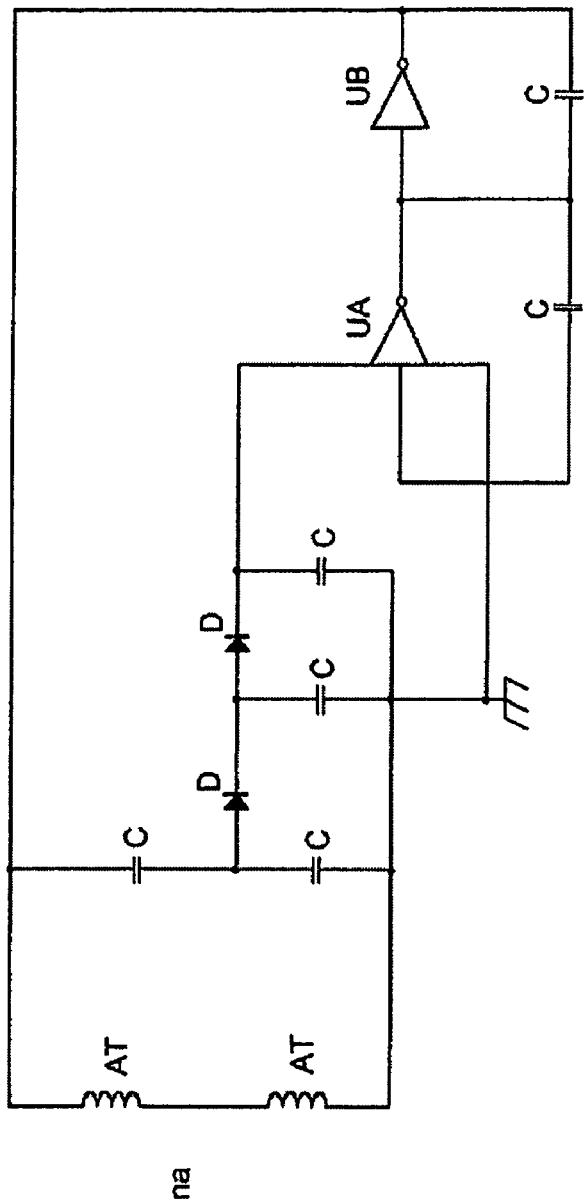

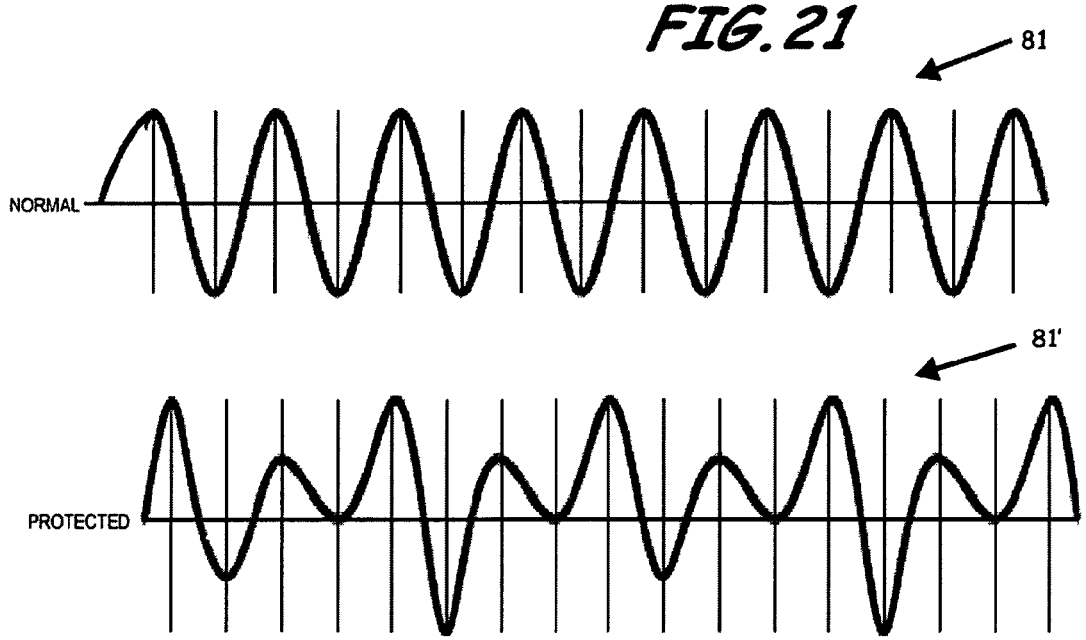
FIG. 21
FIG. 22
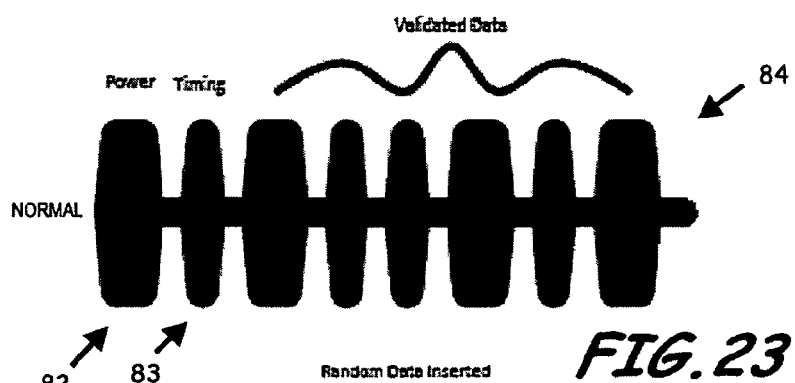
FIG. 23
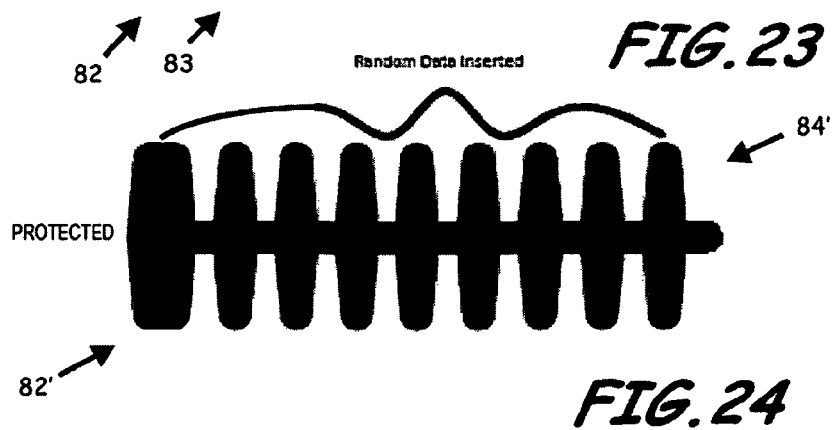
FIG. 24

RFID PROTECTION DEVICE, AND RELATED METHODS

RELATED APPLICATIONS

This application is a continuation-in-part of and claims priority to and the benefit of U.S. patent application Ser. No. 11/581,896, filed Oct. 17, 2006, titled "RFID Protection System, Device, Combination, and Related Methods," which claims the priority to and the benefit of U.S. Provisional Patent Application No. 60/731,750, filed Oct. 31, 2005, titled "RFID Protection System, Device, Combination, and Related Methods," each incorporated herein by reference in its entirety.

BACKGROUND OF THE INVENTION

1. Field of the Invention

The present invention relates to the field of contactless circuitry and, more particularly, to Radio Frequency Identification ("RFID") devices and methods related to prevent the unauthorized interrogation and tracking thereof.

2. Description of Related Art

Theft of credit or debit card information and identification has become rampant worldwide. Governments, companies, and consumers spend millions of dollars each year to prevent and pursue such thefts.

Over the years, various types of identification technology have been used for credit or debit cards and for identification. These, for example, have included pin numbers, bar codes, and magnetic strips. More recently, however, steps have been taken to use RFID or other contactless chip technology in association with credit or debit cards, passports, documents, and other areas where identification, including portable and remote, are desired. An example of such applications of RFID can be seen in a recent news article titled "Contactless Traveling" by Wright (Electronic Design News (EDN) Jul. 7, 2005) for passport applications.

Other types of uses of RFID have emerged, not necessarily coinciding with the desires of the owner of the RFID device. For example, some retailers have instituted what can only be considered inappropriate tracking of the RFID device users in order to analyze their buying habits. Such tracking ability may provide government agencies an ability to continually track an individual's movements. Although appearing somewhat futuristic, it would appear that various governments are currently spending billions of dollars for data mining operation centers to collect data on various commercial transactions. Eventually they may embed RFID tags into all required government documents. Various government agencies would know this and could use the various tracking techniques to track of any individual's movements by pinging the individual's RFID device at opportune locations with RFID interrogation devices or other forms of RFID readers.

The recent developments in technology do not fully address potential security breaches of the RFID such as when an unauthorized RFID interrogation or reading device attempts to extract the RFID information or track the RFID device, especially when a user or possessor of an RFID device is unsuspecting or not cognizant that the RFID device is being interrogated.

Others have attempted solutions at creating blocking RFID devices to enhance privacy. Examples can be seen in U.S. Patent Application Publication No. 2004/0222878 A1 by Juels titled "Low-Complexity Cryptographic Techniques For Use With Radio Frequency Identification Devices," U.S. Pat. No. 6,970,070, by Juels, et al. titled "Method and Apparatus For Selective Blocking of Radio Frequency Identification Devices," and U.S. Pat. No. 7,298,243 by Juels, et al. titled "Radio Frequency Identification System With Privacy Policy Implementation Based on Device Classification." Such attempted solutions, however, do not provide a protection capability that can be applied independent of the information contained in the RFID device to be protected, or the location of the device with respect to the external environment. That is, such devices generally either require a classification engine, require positioning in a designated privacy zone, require application of a specified privacy policy, require knowledge of the identifier of the device to be protected, or require some form of information encryption.

Accordingly, there still exists a need for a simple, flexible, and practical security and privacy protection solution for RFID and other contactless circuitry or chip devices, which can prevent a transmission from an RFID reader or scanner from activating an RFID device, which can prevent the reader from receiving readable data if activated, and which can indicate to the user when an RFID reader or scanner is attempting to interrogate the user's RFID device. There also exists a need for a simple, flexible, and practical security and privacy protection solution which can be restricted to functioning only when in close proximity to the device to be protected, regardless of the location of the device with respect to the external environment, and that will not interfere with the operation of an RFID device reader or scanner when not positioned in close proximity to the device to be protected.

Factors such as expense, size, practical and flexible use requirements for RFID and other contactless chip technology create problems and barriers for widespread use in many applications. Accordingly, there further exists a need for a solution that provide users of RFID devices increased flexibility with little or no increase in expense or size, and yet effectively block or otherwise prevent unauthorized access to RFID information associated with the RFID device to be protected.

SUMMARY OF THE INVENTION

In view of the foregoing, various embodiments of the present invention advantageously provide combinations, devices, and methods of enhanced RFID protection against unauthorized reading or interrogation of an RFID device, which can prevent a transmission from a reader or scanner from activating an RFID device, which can prevent the reader from receiving readable data if activated, and which can indicate to the user when an RFID reader or scanner is attempting to interrogate the user's RFID device. Various embodiment of the present invention also advantageously include combinations, devices, and methods that can advantageously provide users of RFID devices increased flexibility with little or no increase in expense or size and yet effectively block unauthorized access to RFID information associated with a device. Various embodiments of the present invention also advantageously provide personal privacy countermeasures, not just in the form of data protection, but protection of financial or other personal information and/or a unique indicator (e.g., credit/debit card account number, account ID, PIN, license number, Social Security number, employee identification number, etc.) from being logged without the individual's knowledge. Various embodiments of the present invention can perform such objectives by making the RFID device functionally invisible to the RFID reader when the RFID device is being protected.

An example of an embodiment of the present invention provides a combination of a separate RFID device and a separate RFID signal capture device each configured to be positioned separately into a container. More specifically, the combination includes a separate RFID device carrying and RFID transponder (tag) configured to be positioned in the container and a separate RFID signal capture device configured to be positioned adjacent the separate RFID device and in the container so that when an unauthorized RFID interrogation device attempts to interrogate the separate RFID device from within the container, the separate RFID signal capture device positioned adjacent the separate RFID device blocks or otherwise prevents the attempted read, and configured so that when an authorized user desires to use the separate RFID device for an authorized read, the authorized user selectively removes either the separate RFID device or the separate RFID signal capture device from being adjacent each other and presents the separate RFID device for the authorized read.

Another example of an embodiment of a device to prevent unauthorized RFID interrogation when the device is positioned adjacent a separate RFID device, includes an RFID signal capture device including an incoming signal detector configured to detect an incoming signal attempting to interrogate the separate RFID device responsive to the detection of the incoming interrogation signal to respond to the incoming interrogation signal with disruptive read signals.

Another example of an embodiment of a device for preventing unauthorized RFID interrogation when the device is positioned adjacent a separate RFID device, includes an RFID signal capture device including an incoming signal detector to detect incoming RFID interrogation signals responsive thereto, and an RFID interferer to interfere with activation of operation ability of the separate RFID device responsive to the incoming signal detector.

Another example of an embodiment of a device to prevent unauthorized RFID interrogation includes an RFID signal capture device that works with the RF carrier of the tag/transponder circuit of an RFID device to be protected using any standard modulation or data protocol, such as, for example, ASK, FSK, or PSK, etc. Advantageously, the RFID signal capture device, according to this exemplary embodiment, does not directly emit or radiate signals, but rather, only captures the signal from the tag and disrupts the normal operation of the tag of the RFID device to be protected. The tag of the RFID device can include an LC tuned circuit, for example, set to 13.56 MHz for operations with RFID devices and RFID readers that communicate using this frequency. The RFID signal capture device can inductively couple with the LC tuned circuit of the tag of the RFID device to disrupt the signal received by the RFID device. Note, because of the coupling of the RFID signal capture device with the REID tag of the RFID device to be protected, a 6.78 MHz signal at ½ the power and/or a 26 MHz (second harmonic) may be present to further disrupt the normal operation of the tag. This configuration has been found through testing to allow the RFID signal capture device to provide protection to an RFID device at all distances from the RFID reader when placed, for example, within ½ inch (12 mm) or so of the tag of the RFID device.

Further, because the antenna/coil/transceiver portion of the RFID signal capture device is not a tuned circuit, according to this configuration, advantageously, the RFID signal capture device affects only the tag when in close proximity as it must couple with the tuned circuit of the tag to operably function. As such, when not coupled with a tag, the device has substantially no effect on either the RFID device (or devices/tags) to be protected or on the RFID reader. Testing of the RFID signal capture device according to this configuration showed that the RFID reader could still read RFID tags not coupled with the RFID signal capture device even when the device was physically placed on the reader. That is, as noted above, the RFID signal capture device, according to this configuration, is activated by the electrical field that is produced at the RFID tag's coil/antenna, and not merely from the incoming signal from the RFID reader independent of the RFID device to be protected.

The RFID signal capture device can advantageously include an internal phase capture that changes the impedance of the tag's tuned circuit, which causes a phase variance of the 13.56 MHz carrier for the RFID tag when in close proximity, thus, inhibiting the tag of the protected RFID device from responding to the reader. Also advantageously, the RFID signal capture device can be configured to function without a permanent internal power source, thus preventing the RFID signal capture device from radiating a signal without the passive RFID tag or tuned circuit to allow power harvesting, so that the device can only be activated when the electrical field is present in the RFID tag and when the two devices are in close proximity. In other words, the RFID signal capture device ceases to function when the field is removed—i.e., when the RFID signal capture device and the RFID device to be protected are sufficiently physically separated, regardless of the position of the RFID reader.

Advantageously, by providing user separable RFID or other contactless circuitry signal capture devices and RFID or other contactless circuitry devices, various embodiments of combinations, devices and methods of the present invention advantageously provide flexibility, portability, and user controlled protection for a user's RFID or other contactless circuitry device.

Another example of an embodiment of a device to prevent unauthorized RFID interrogation (e.g., an RFID signal capture device), for example, performs such actions by preventing data transfer between a nearby RFID reader including an RFID reader inductor and an RFID tag including an RFID tag inductor/coil ("antenna"), for example, carried by a personal identification or financial transaction medium, which together form an RFID device to be protected. The device can include a container, a signal capture circuit carried by the container, and an interrogation indicator carried by the container.

The container can be, for example, in the form of a plastic card similar to a standard credit/debit card, an ID device or passport, or alternatively in another form such as, for example, a wallet, purse, card carrier, or other medium to carry both the RFID device to be protected and the RFID signal capture device. In the alternative form, a pocket or card holder section in the wallet, purse, etc., can advantageously have the RFID signal capture device embedded therein to protect any RFID devices (credit, debit, phone cards, etc., or ID cards) when stowed away in the respective wallet, purse, etc.

The signal capture circuit of the RFID signal capture device can be configured to mutually inductively couple with the RFID tag when positioned in close proximity thereto and when the RFID reader is producing an interrogation signal to thereby effectively prevent data transfer between the RFID tag and the RFID reader. The signal capture circuit can include a signal capture circuit antenna separate from the antenna of the tag of the RFID device to be protected, but nevertheless positioned to receive an interrogation signal carrying a data signal from the RFID reader directed to the RFID device to be protected, and can include a signal processing portion operably coupled thereto. The signal processing portion can include a timing synchronizer and an amplifier/ transistor/amplifier module positioned to return a modified carrier signal responsive to the interrogation signal to thereby effectively prevent the data transfer between the RFID reader and the RFID tag.

The interrogation indicator of the RFID signal capture device can be configured to indicate to a user of the RFID device carrying the RFID tag that the RFID reader is attempting to interrogate the RFID tag when both positioned in close proximity to the RFID tag and when the RFID reader is producing the interrogation signal. The interrogator indicator can include an interrogation indicator antenna positioned to receive an interrogation signal from the RFID reader, a power circuit or module to harvest power and/or extended storage of power, and an indicator circuit module or other form of circuit including an audible indicator and/or a visual indicator, configured to indicate to the user of the RFID tag that the RFID reader is attempting to interrogate the RFID tag when RFID signal capture device is positioned in close proximity to the RFID tag and when the RFID reader is producing the interrogation signal.

Another example of an embodiment of a device to prevent unauthorized RFID interrogation, for example, by preventing data transfer between a nearby RFID reader and an RFID device to be protected provides an RFID signal capture device including a container, a signal capture circuit carried by the container and configured to mutually inductively couple with the RFID tag when positioned in close proximity thereto and when the RFID reader is producing an interrogation signal, and can include an interrogation indicator carried by the container and configured to indicate to a user of the RFID tag when positioned in close proximity thereto and when the RFID reader is producing the interrogation signal that the RFID reader is attempting to interrogate the RFID tag.

The interrogation indicator can include an antenna positioned to receive an interrogation signal from the RFID reader, a voltage rectifier positioned to provide operational interrogator indicator circuit power responsive to the interrogation signal, and an indicator including an audible indicator and/or a visual indicator configured to indicate to the user of the RFID tag that the RFID reader is attempting to interrogate the RFID tag when RFID signal capture device is positioned in close proximity to the RFID tag and when the RFID reader is producing the interrogation signal.

The RFID signal capture device, according to this configuration, can advantageously not only indicate the presence of an interrogation signal, but can also substantially disrupt the signal provided by the RFID reader so that the RFID device to be protected cannot properly identify the timing signal provided by the reader, and even if identified, cannot properly extract the data provided by the RFID reader sufficient to be able to respond to thereby effectively prevent data transfer between the RFID tag and the RFID reader. Further, even if obtaining sufficient data to respond, the RFID signal capture device can advantageously substantially disrupt the signal provided by the RFID device to be protected so that the RFID reader is unable to extract sufficient data provided by the RFID device to be protected to either obtain the protected information or to identify the user in order to track the actions or movement of the user.

Another example of an embodiment of a device to prevent unauthorized RFID interrogation, for example, by preventing data transfer between a nearby RFID reader and an RFID device to be protected, includes a container and a signal capture circuit carried by the container and configured to mutually inductively couple with the RFID transponder when positioned in close proximity thereto and when the RFID reader is producing an interrogation signal of sufficient strength to interrogate the RFID transponder and to prevent data transfer between the RFID transponder and the RFID reader responsive to being positioned in close proximity to the RFID transponder and responsive to the RFID reader producing an interrogation signal of sufficient strength to interrogate the RFID transponder.

Embodiments of methods of enhancing protection against unauthorized interrogation of an RFID or other contactless circuitry device, are also provided. An example of an embodiment of a method can include positioning a separate RFID signal capture device adjacent a separate RFID device to block RFID interrogation and selectively separating the separate RFID device from the separate RFID signal capture device for authorized interrogation of the separate RFID device. Another example of an embodiment of a method of enhanced protection against unauthorized interrogation of a contactless circuiting device includes positioning a separate contactless circuitry signal capture device in association with a container and adjacent a separate contactless circuitry device to thereby block unauthorized interrogation of the separate contactless circuitry device, and selectively separating the separate contactless circuitry device from being adjacent the separate contactless circuitry block device for authorized interrogation of the separate contactless circuitry device.

Another example of an embodiment of a method can include inductively coupling an RFID signal capture device with the RFID tag (or multiple tags) being protected and the RFID reader to thereby effectively prevent data transfer between the RFID tag and the nearby RFID reader when the RFID signal capture device is positioned by a user in close proximity to the RFID tag and when the RFID reader is producing an interrogation signal, and inductively coupling the RFID signal capture device with the RFID tag when positioned in close proximity to the RFID tag and when the RFID tag is producing a reply to an interrogation signal.

The method can also include indicating to the user of the RFID tag that the RFID reader is attempting to interrogate the RFID tag when the RFID reader is producing the interrogation signal and when the RFID signal capture device is in close proximity to the RFID tag, whereby such indication is not provided when the RFID signal capture device is not in close proximity to the RFID reader (i.e., when the indicator circuit is not receiving a sufficient signal strength). The indicating can include illuminating a visual indicator carried by the RFID signal capture device, and/or sounding an audible indicator carried by the RFID signal capture device.

The method can also include the step of allowing data to transfer between the RFID device and an RFID reader by selectively substantially separating the RFID signal capture device from being adjacent the RFID tag to allow authorized interrogation of the RFID tag. Accordingly, the RFID signal capture device can be configured to not interfere with operation of the RFID reader when the RFID signal capture device is not positioned in close proximity to an RFID tag.

BRIEF DESCRIPTION OF THE DRAWINGS

So that the manner in which the features and advantages of the invention, as well as others which will become apparent, may be understood in more detail, a more particular description of the invention briefly summarized above may be had by reference to the embodiments thereof which are illustrated in the appended drawings, which form a part of this specification. It is to be noted, however, that the drawings illustrate only various embodiments of the invention and are therefore not to be considered limiting of the invention's scope as it may include other effective embodiments as well.

FIG. 10 is a schematic diagram of a signal capture circuit of an RFID signal capture device according to an embodiment of the present invention;

FIG. 11 is a schematic diagram of a signal capture circuit of an RFID signal capture device according to an embodiment of the present invention;

FIG. 21 is a schematic diagram of a carrier wave emanating from an RFID reader during normal operations;

FIG. 22 is a schematic diagram of an example representation of the carrier wave of FIG. 21 being phase and amplitude adjusted as a result of positioning the RFID signal capture device in close proximity to the RFID tag according to an embodiment of the present invention;

FIG. 23 is a schematic diagram of a data signal emanating from an RFID reader during normal operations;

FIG. 24 is a schematic diagram of an example representation of the data signal of FIG. 23 being phase and amplitude adjusted as a result of positioning the RFID signal capture device in close proximity to the RFID tag according to an embodiment of the present invention;

DETAILED DESCRIPTION

Figure 1:
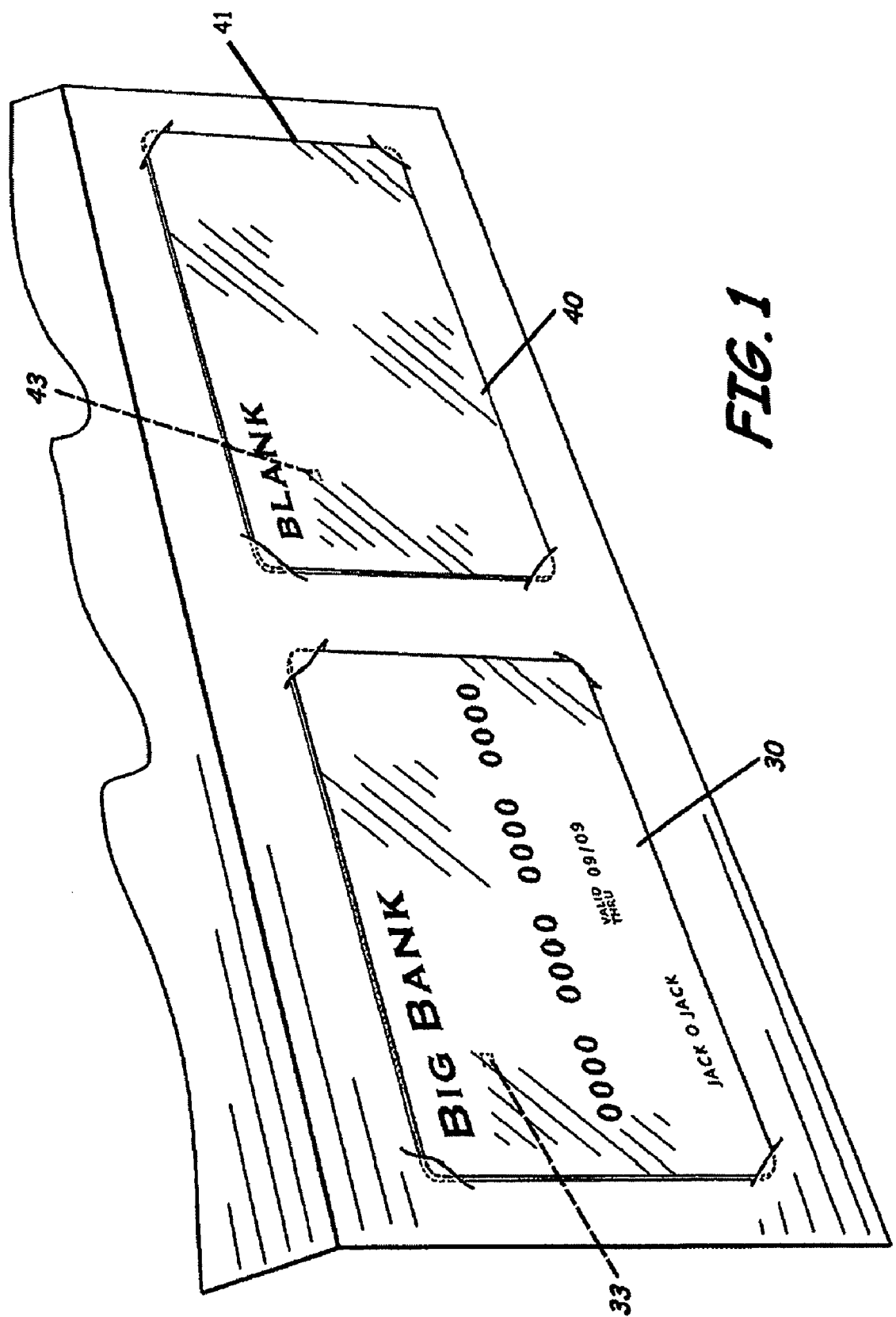
FIG. 1 is a perspective view of a combination of a separate RFID device and a separate RFID signal capture device positioned in a container according to an embodiment of the present invention.

The present invention will now be described more fully hereinafter with reference to the accompanying drawings, which illustrate embodiments of the invention. This invention may, however, be embodied in many different forms and should not be construed as limited to the illustrated embodiments set forth herein. Rather, these embodiments are provided so that this disclosure will be thorough and complete, and will fully convey the scope of the invention to those skilled in the art. Like numbers refer to like elements throughout. Prime notation, if used, indicates similar elements in alternative embodiments. Note, as used herein, the terms "nearby" and "in close proximity" generally mean approximately within the interrogation response field of the referred to radiofrequency identification (RFID) device, interrogation response field of the referred to RFID signal capture device, and/or interrogation range of the referred to RFID interrogator or other reader.

As perhaps best shown in FIGS. 1-5, various embodiments of the present invention provide a RFID signal capture device 40 including, for example, a signal capture circuit 43 carried by a container (e.g., plastic card 41) configured to effectively prevent data transfer between a nearby RFID interrogator/scanner or other form of RFID reader 50 (see, e.g., FIG. 26) as known and understood by those skilled in the art, and an RFID device 30 including an RFID transponder or other circuit typically referred to as an RFID tag 33 as known and understood by those skilled in the art, which is configured to inductively couple with an RFID reader circuit 53 of the RFID reader 50. The RFID signal capture device 40, for example, in a preferred configuration, can protect the information contained in the RFID tag 33 carried by various RFID devices 30 including any standard ISO 14443 and ISO 15593 credit or personal ID card, etc., from being read surreptitiously. Beneficially, the preferred configuration of the RFID signal capture device 40 requires that the device 40 be in close proximity to the RFID card(s) or other devices 30 to be protected, as shown, for example, in FIG. 3, in order to perform its protective function. That is, according to the preferred configuration, when the device 40 is not near an RFID card(s)/device(s) 30 to be protected, i.e., not within the interrogation response field or e-field 37 (see, e.g., FIG. 2), it will be powered down and will not interfere with the normal operation of the RFID reader 50.

Figure 5:
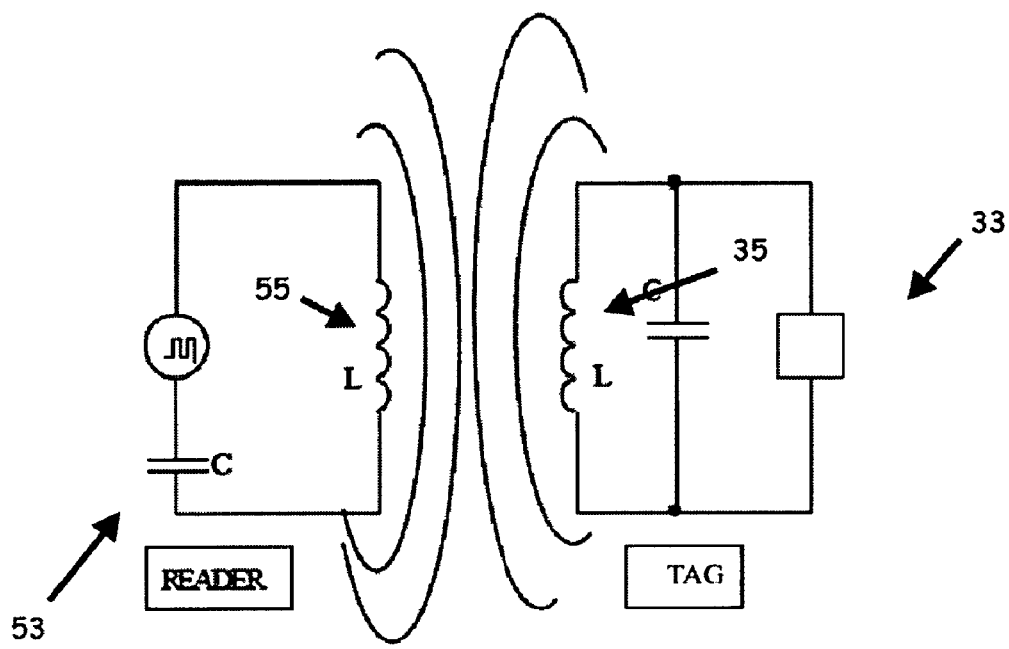
FIG. 5 is a schematic diagram illustrating inductive coupling between an RFID reader and an RFID device.

As perhaps best shown in FIG. 5, in order to function properly, inductively coupled passive RFID systems as known and understood by those skilled in the art, need good coupling and maximum energy transfer from the RFID reader circuit 53 of the RFID reader 50 to RFID tag 33. For this reason, such systems generally use parallel inductor-capacitor ("LC") circuits in the tag antenna 35 and series LC circuits in the reader antenna 55, as understood by those skilled in the art. To generate the maximum power field in the RFID device 30, the RFID reader circuit 53 of the RFID reader 50 is generally designed to achieve maximum coil/antenna current at the resonant frequency. Since current through a coil generates a magnetic field, this field is generally maximized in a series LC circuit, whose impedance approaches zero at resonance. To maximize the voltage gain at resonance in an RFID tag 33, a parallel LC circuit is typically used which provides an impedance that approaches infinity at resonance. In a system designed to read standard ISO 14443 and ISO 15593 cards 30, for example, the power provided by an appropriate RFID reader 50, or more particularly, the RFID reader circuit 53 of the RFID reader 50, generates at least a 3-volt field in the RFID tag 33 when it is placed in proximity. Note, hereinafter, the terms RFID reader circuit 53 and RFID reader 50 may be used interchangeably for illustrative purposes.

Figure 6:
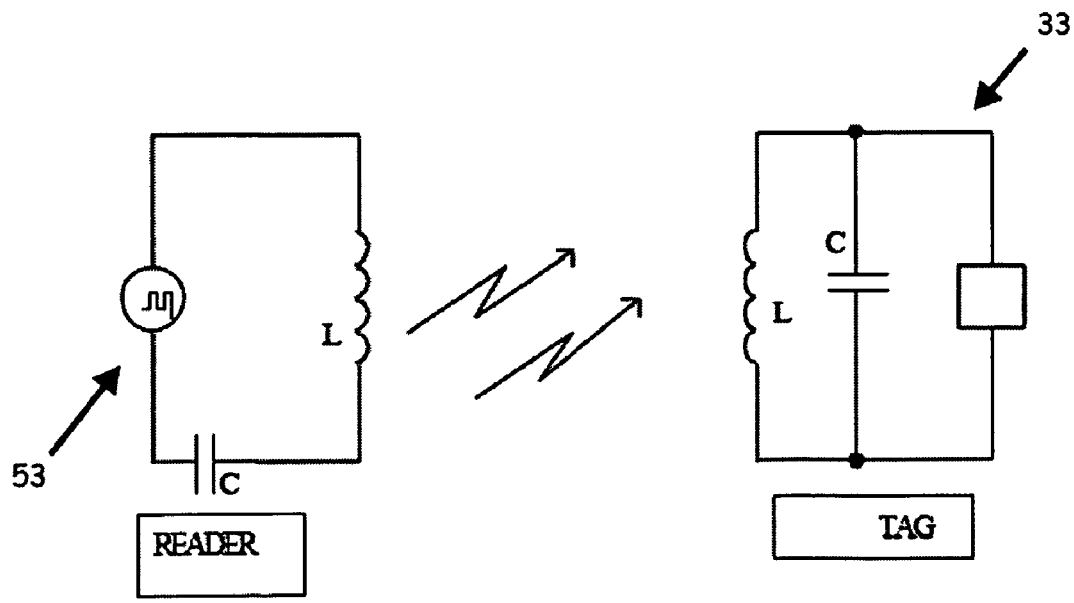
FIG. 6 is a schematic diagram illustrating data transmission between an RFID reader and an RFID device.

As perhaps best shown in FIG. 6, during normal operation of a financial or personal transaction between an RFID reader 50 and an RFID device 30, the RFID reader circuit 53 of the RFID reader 50 provides power, clock, and data for the tag 33 of the RFID device 30. The tag 33 will then "talk" back to the RFID reader 50 with the account number and other information as understood by those skilled in the art. Most credit card transactions are very quick since the data transfer rate is quite high.

As perhaps best shown in FIGS. 7-8 and 12-13, and as will be described in more detail later, the signal capture circuit 43 of the RFID signal capture device 40 according to the illustrated configuration, has no tuned circuit on the antenna, and therefore, must be coupled with the RFID device 30, for example, in order to be active. Once the RFID tag 33 comes into contact with a signal from the RFID reader 50 (i.e., RFID reader circuit 53) having a sufficient signal strength, the signal capture circuit 43 of the RFID signal capture device 40 becomes inductively coupled with the RFID tag 33 of the RFID device 30 in a transformer-type circuit. Once sufficient operating power is achieved, the signal capture circuit 43 begins to disrupt communication between the RFID device 30 and the RFID reader 50. According to the exemplary configuration, this can be accomplished by capturing the e-field 37 of the tag 33 to thereby prevent the tag 33 from "seeing" the RFID reader's data. In this configuration, the signal capture circuit 43 uses energy from the field 37 of the tag 33 of the RFID device 30, and does not emit signals back to the RFID reader 50 when not coupled with the tag 33 of the RFID device 30. Further, in this configuration, when a "nearby" multiple tags 33 and when each tag 33 is receiving a sufficient signal strength from the RFID reader 50, the un-tuned signal capture circuit 43 captures the e-field of at least one tag 33, but more preferably, each of the tags 33, simultaneously, in order to protect all of the tags 33.

Inductively coupled systems, including passive 13.56-MHz RFID systems used by the financial services industry, for example, generally behave like loosely coupled transformers (see, e.g., FIG. 5) as understood by those skilled in the art. The magnetic coupling between the primary winding (e.g., reader antenna coil 55) and secondary winding (tag antenna coil 35) conveys power from RFID reader 50 to the RFID tag 33. Tuned LC circuits are typically used at these frequencies to maximize coupling between the primary and secondary winding. The RFID reader 50 continuously emits RF carrier signals and observes any received RF signals for data.

Under normal unprotected operations, when within range of a passive RFID transponder, such as tag 33, for example, the presence of the tag 33 modulates the RF field generated by the RFID reader circuit 53 of the RFID reader 50. The RFID reader circuit 53 correspondingly detects such modulation. Prior to modulating the RF field, the passively configured tag 33 absorbs a small amount of energy emitted by the RFID reader circuit 53, which is used by the tag 33 to effectively transfer "send" the modulated data once sufficient energy is acquired from the RF field generated by the RFID reader circuit 53. The RFID reader circuit 53 demodulates the signals modulated by the tag 33, and decodes the information for further processing. For RFID devices 30 expecting to be utilized in the presence of other RFID devices 30 and RFID devices 30 carrying multiple RFID tags 33, the tags 33 may be configured with an anti-collision protocol, described later, which in a typical example, can cause each RFID tag 33 to slightly off-tune. Similarly, the RFID reader circuit 53 may be configured with an anti-collision protocol which can cause the RFID reader 50 to slightly off-tune.

Under protected operations, i.e., when the signal capture circuit 43 of the RFID signal capture device 40 is positioned in close proximity to the RFID tag 33, or vice versa, the e-field 37 required by the RFID tag 33 is disrupted. When protecting multiple closely positioned RFID tags 33, simultaneously, the inductive coupling of the RFID signal capture device 40 can be with only one of the RFID tags 33 to sufficiently disrupt or suppress the e-field 37 of each RFID tag 33. Note, any sine wave signal will activate the RFID signal capture device 40 provided the power level is strong enough, and the RFID signal capture device 40 is in close proximity to the RFID tag 33. As such, according to the exemplary configuration, protection can be provided to each of the RFID tags 33, as long as the RFID tags 33 are within the e-field 47 of the signal capture circuit 43 of the RFID signal capture device 40 when being activated.

Figure 12:
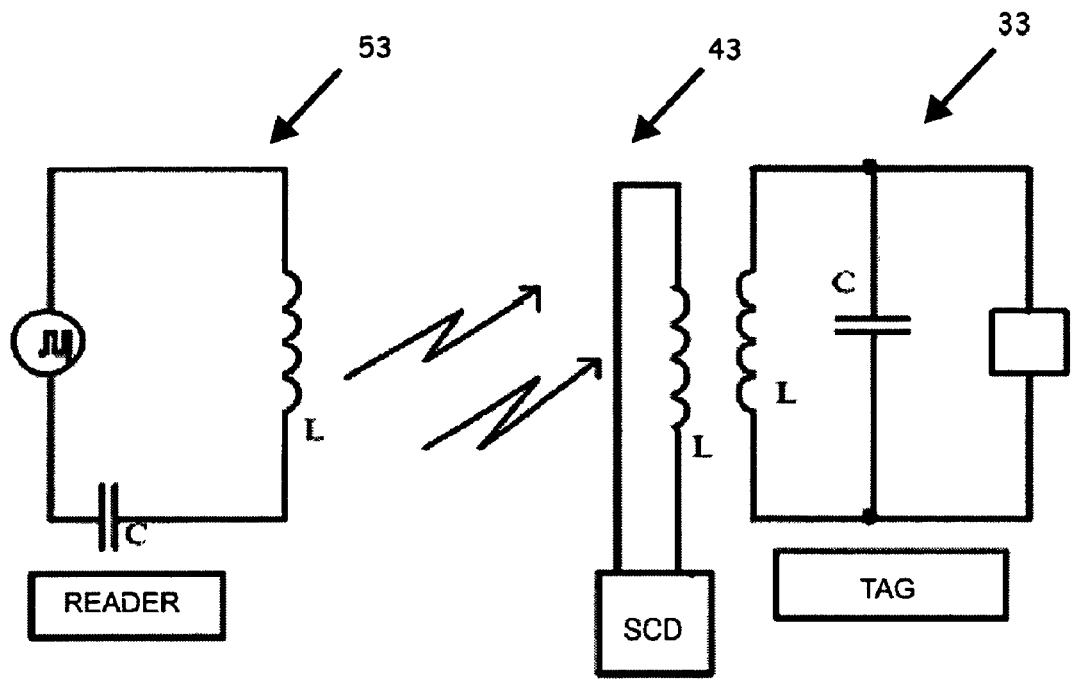
FIG. 12 is a schematic diagram of an RFID signal capture device positioned in close proximity to an RFID device to be protected being interrogated by an RFID reader according to an embodiment of the present invention.
Figure 13:
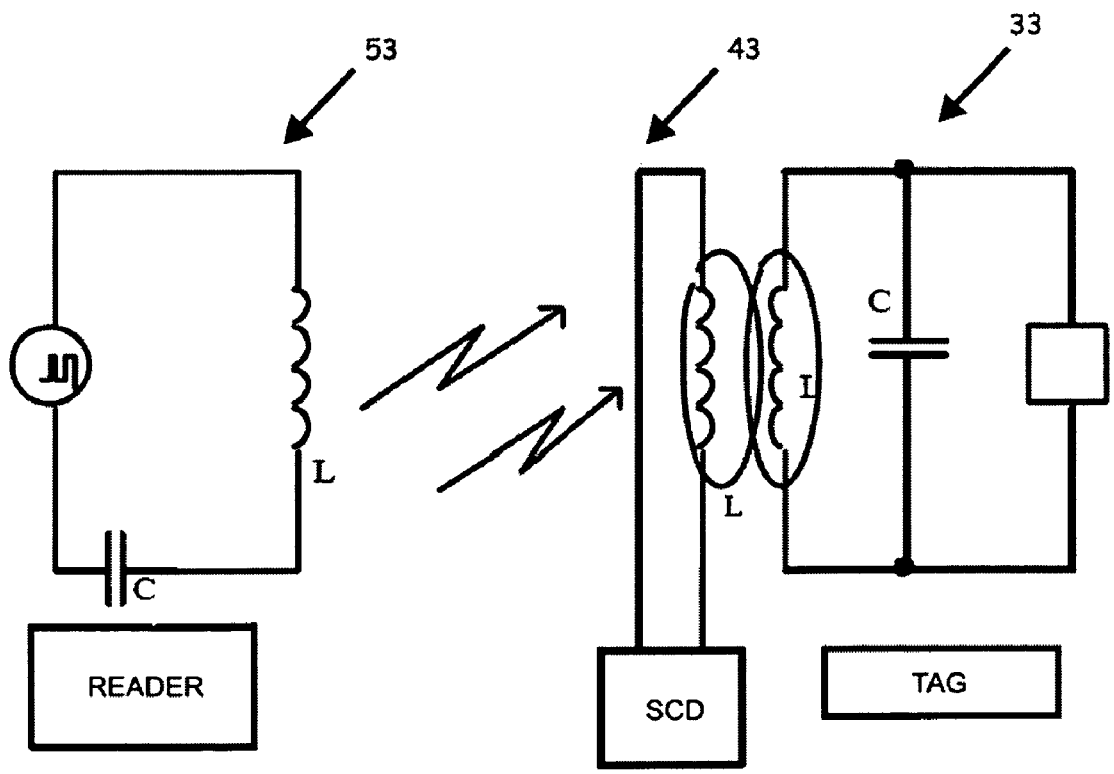
FIG. 13 is a schematic diagram of an RFID signal capture device inductively coupling with an RFID device to be protected in response to an interrogation by an RFID reader according to an embodiment of the present invention.

According to the configuration illustrated in FIGS. 12-13, a time-variant field from the RFID reader circuit 53, which reader coil/antenna 55 generates and the tag coil/antenna 35 receives, induces current and voltage across the tag coil/antenna 35 as understood by those skilled in the art. The signal capture circuit 43 of the RFID signal capture device 40 effectively captures this energy when coupled with an RFID tag 33 and performs one or more disruptive functions which resultingly prevent any useful data exchange. Such disruptive functions can include frequency-based data modulation (e.g., frequency shift keying or analog frequency modulation), phase-based data modulation (e.g., phase shift keying or analog phase modulation), and/or amplitude-based data modulation (e.g., amplitude shift keying/backscatter modulation, on-off shift keying, tuning-detuning, or various forms of digital or analog amplitude modulation) as understood by those skilled in the art.

Figure 15:
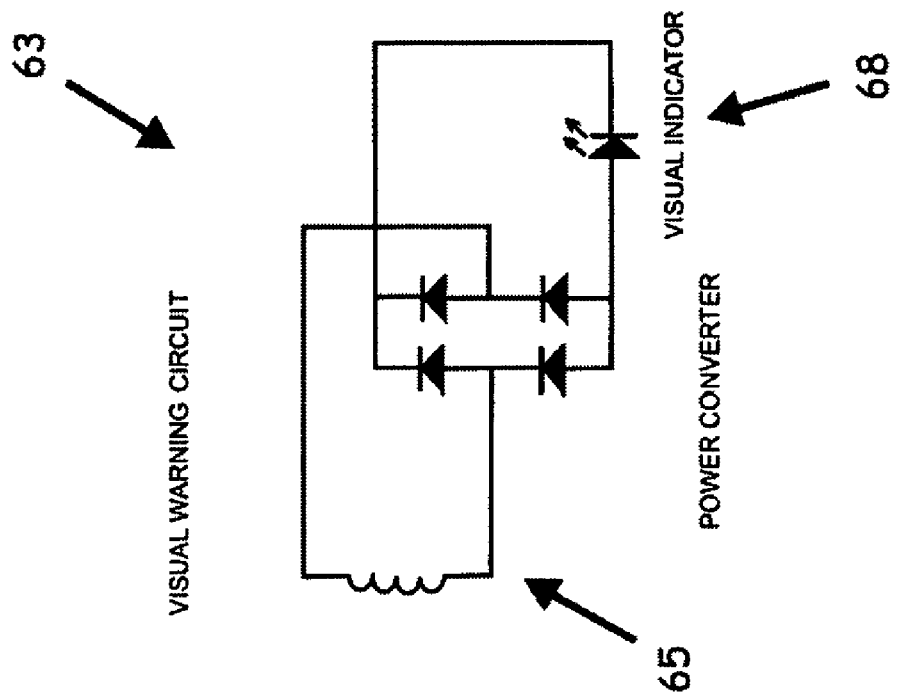
FIG. 15 is a schematic diagram of a visual form of an interrogation indicator circuit of an RFID signal capture device according to an embodiment of the present invention.
Figure 14:
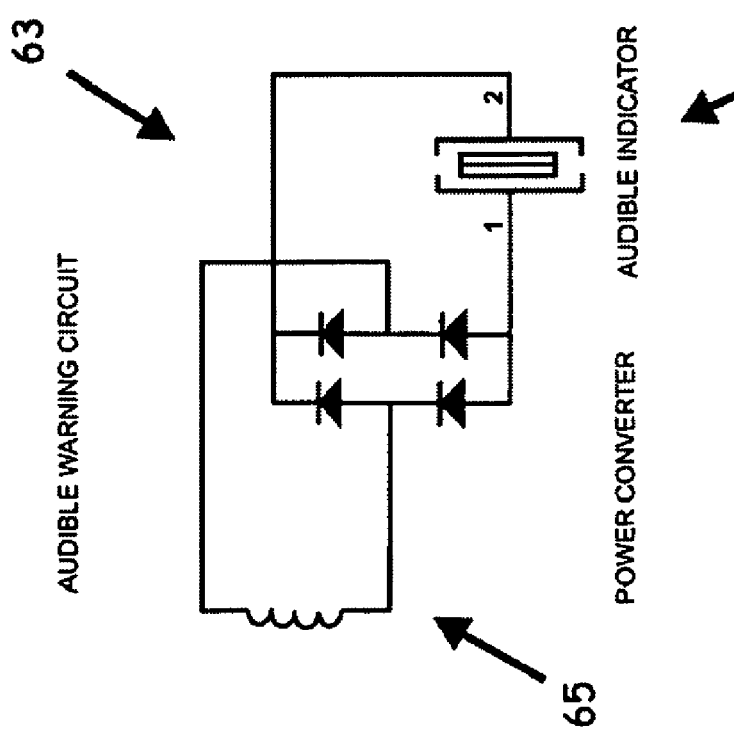
FIG. 14 is a schematic diagram of an audible/vibratory form of an interrogation indicator circuit of an RFID signal capture device according to an embodiment of the present invention.

Further, as perhaps best shown in FIGS. 14 and 15, and as will be described in more detail later, the RFID signal capture device 40, according to the illustrated configuration, can include an interrogation indicator 63 configured to indicate to a user of the RFID device 30 that an RFID interrogator or other reader 50 is attempting to interrogate the RFID tag 33, or more particularly, to indicate when the interrogation indicator 63 of the RFID signal capture device 40 is receiving a signal of sufficient strength to interrogate the RFID tag 33, regardless of position—i.e., when the RFID reader 50 is producing an interrogation/read signal (i.e., power and/or handshake signal) sufficient to read data from the RFID tag 33 of the RFID device 30 (i.e., sufficient when not being protected). This embodiment of the interrogation indicator 63, can beneficially allow the user to sweep an area or location with the RFID signal capture device 40 to determine whether or not an RFID reader 50 signal is being generated, and/or to indicate that an RFID reader 50 is generating an interrogation signal of sufficient strength when the RFID tag 33 is being protected against an unauthorized interrogation/read signal having a substantially sufficient strength to read data from the RFID tag 33. In a first alternate configuration, the interrogation indicator 63 can identify an interrogation signal having a signal strength substantially less than that required to read the protected RFID device 30, but greater than that of background noise. In a second alternate embodiment of the interrogation indicator 63, the interrogation indicator 63 can be configured to indicate that an RFID reader 50 is generating an interrogation signal of sufficient strength to read data from the RFID device 30 only when the RFID tag 33 is positioned in close proximity to the signal capture circuit 43 of the RFID signal capture device 40 and when the RFID reader circuit 53 of the RFID reader 50 is producing an interrogation/read signal sufficient to read data from the RFID device 30.

The interrogation indicator 63 can include an interrogation indicator antenna 65 as understood by those skilled in the art, positioned to receive an interrogation signal from the RFID reader circuit 53 of the RFID reader 50, and an indicator such as, for example, an audible/vibration indicator 67 (e.g., piezoelectric, etc.) and/or a visual indicator 68 (e.g., LED, color sensitive film, etc.) as understood by those skilled in the art, configured to alert the user of the RFID device 30 of the presence of an interrogation signal (i.e., that the RFID reader 50 is attempting to interrogate the RFID tag 33) when RFID signal capture device 40 is positioned in close proximity to the RFID tag 33 and when the RFID reader 50 is producing the interrogation signal. Regardless of the configuration, an indication of attempted or actual data transfer can be provided in the form of a chirping of the audible/vibration indicator 67 or a flicker of the visual indicator 68. Similarly, an indication of an attempted or actual interrogation without data transfer or an interrogation where the data signal riding on the carrier signal is, for example, too high to be visually or audibly distinguished from the carrier signal can be provided, for example, in the form of a relatively constant tone or hum provided by the audible/vibration detector 67 or a relatively steady or continuous illumination of the visual indicator 68. One of ordinary skill in the art should recognize that other audible/vibration and visual indications are within the scope of the present invention.

According to a preferred configuration, the antenna or antennae 65 is independent of the RFID signal capture device antenna (e.g., signal capture circuit antenna/assembly 45), and the RFID device antenna 35. According to embodiments using physical circuit elements (e.g., wire, fiber optics, chemicals, or inks), the indicator 63 can also include a voltage rectifier 69 to increase the power harvesting capability of the indicator 63.

Note, although illustrated in the form of electricity conducting circuits, the interrogation indicator 63 can alternatively take the form of a chemical combination or compound as known to the skilled in the art, positioned on a surface of the RFID signal capture device 40, which will illuminate (e.g., glow) when exposed to the carrier frequency of the RFID reader 50, to indicate the presence of an RFID interrogation signal to the user.

Various tests were performed on an example of an embodiment of the RFID signal capture device 40 for the protection of a RFID device 30 in the form of various credit cards containing an RFID tag 33. Most of the preliminary testing on standard ISO 14443 and ISO 15593 cards credit cards showed that the cards could be read from as much 6 to 8 inches from the transmit antenna/coil 35 of the RFID reader 50. Hackers, however, have shown that these cards can be read from several feet away using illegal readers. Nevertheless, even FCC compliant readers can be small, portable and wireless, and will fit into a handbag or other small case, to facilitate an unauthorized interrogation to acquire critical credit card or other personal information.

Figure 16:
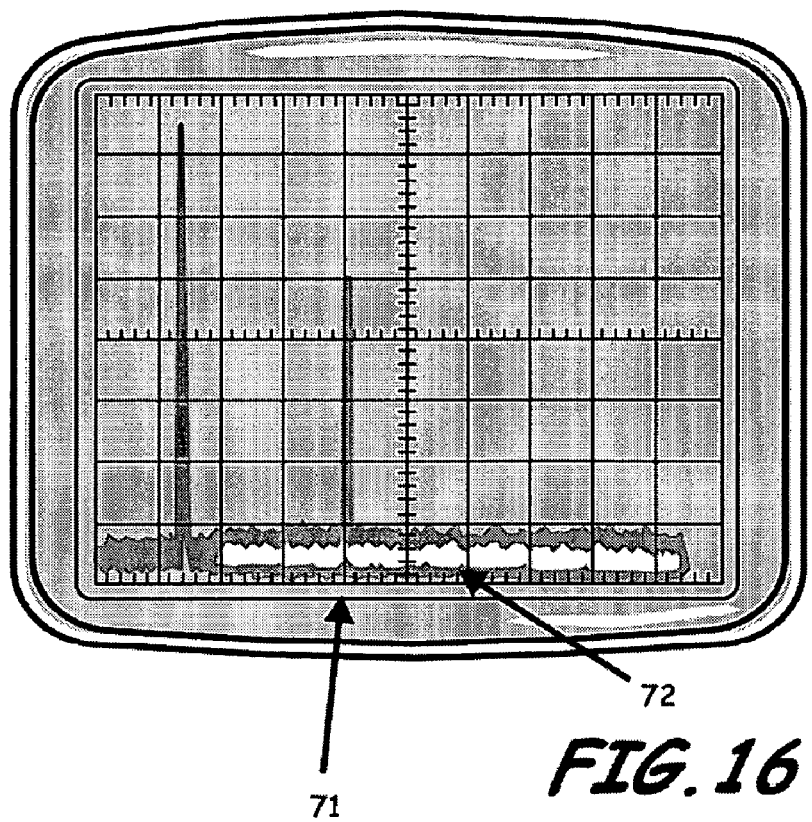
FIG. 16 is an image of a spectrum produced by an RFID reader with no RFID tags or RFID signal capture devices present.

FIG. 16 illustrates a display of a spectral analyzer showing the spectrum at 71 of a 13.56 MHz RFID reader 50, with no RFID tags 33 or RFID signal capture devices 40 present, as "seen" by a tuned instrumentation pickup test antenna (not shown) of a spectral analyzer (not shown) placed approximately 12 inches over the reader's antenna 55. The spectral analyzer was set with a center at −30 db with a −70 db full-scale to the noise, 5 MHZ per division, and with the test antenna positioned approximately 12 inches from the RFID reader 50. The noise shown at 72 around bottom of the spectrum is ambient noise. There are occasional sweeps of data as the RFID reader 50 polls for tags 33. The left most spectrum is the zero reference and the center most spectrum is the 13.56 MHz carrier of the RFID reader 50 used in the test.

Figure 7:
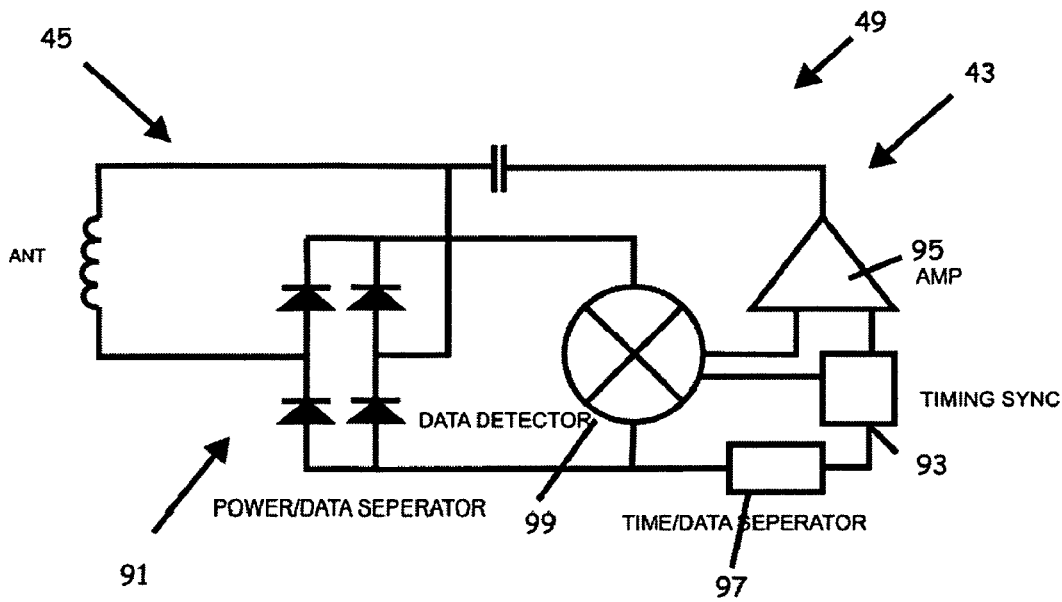
FIG. 7 is a schematic diagram of a signal capture circuit of an RFID signal capture device according to an embodiment of the present invention.
Figure 17:
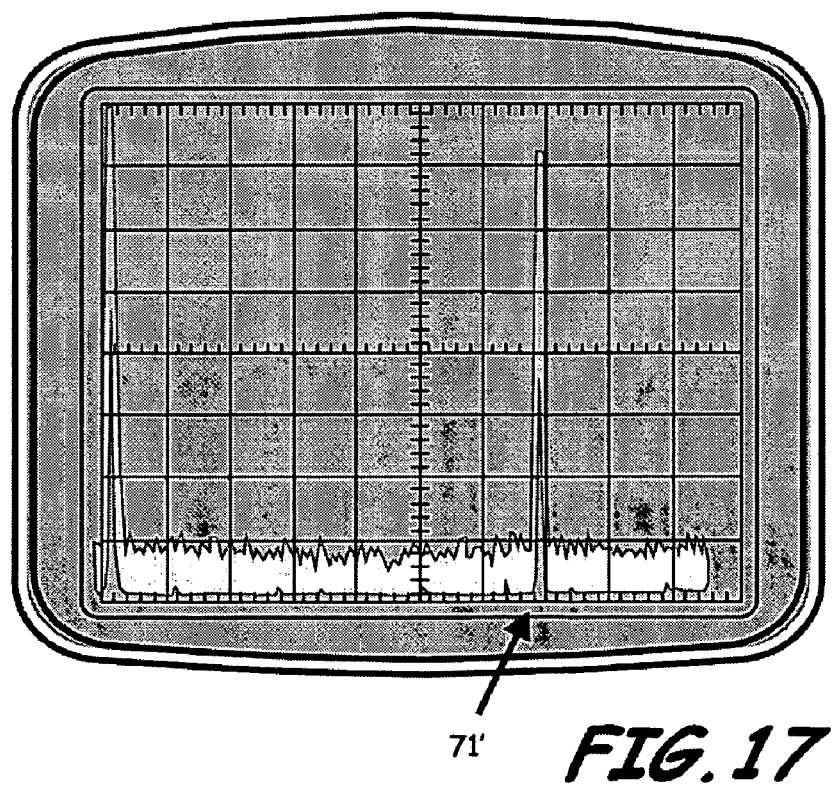
FIG. 17 is an image of a spectrum produced by an RFID reader with an RFID signal capture device positioned adjacent the RFID reader, with no RFID tags present according to an embodiment of the present invention.

FIG. 17 illustrates the spectrum shown at 71' of the RFID reader 50 with a RFID signal capture device 40 having a signal capture circuit 43 according to the configuration shown in FIG. 7, placed 2 inches from reader antenna 55, with no RFID tag 33 present. It can be seen from the displayed spectrum that the RFID signal capture device 40 did not activate in absence of an RFID tag 33.

Figure 18:
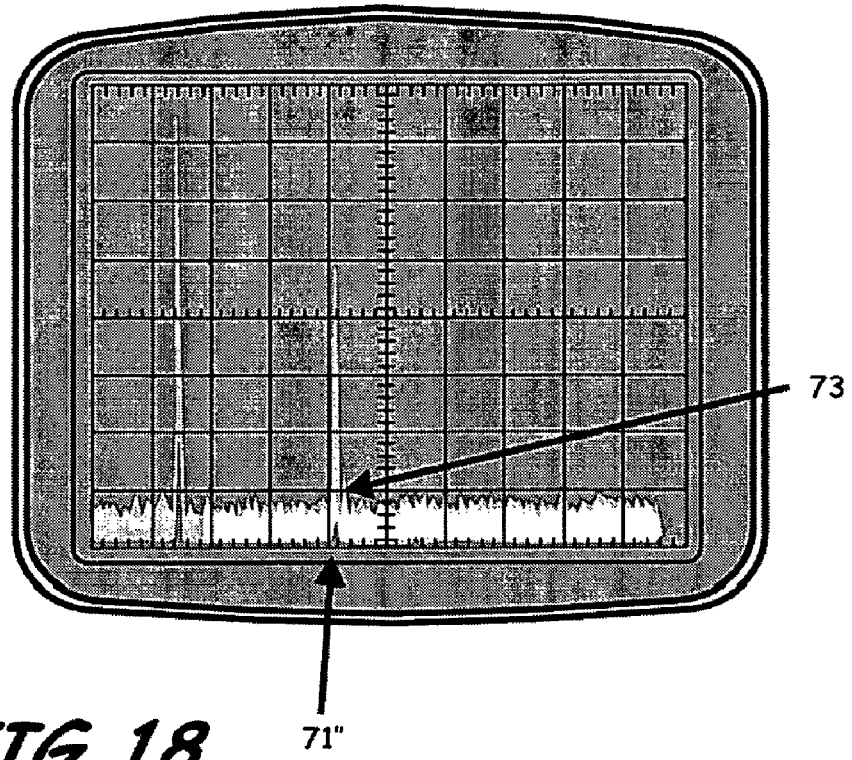
FIG. 18 is an image of a spectrum under normal read operations between an RFID reader and an RFID tag showing both carrier and data signatures.

FIG. 18 illustrates the spectrum shown at 71" of the RFID reader 50 under a normal read operation with an RFID device 30 to be protected in the form of an American Express® Blue Card containing an RFID tag 33 placed on the RFID reader 50 with the instrumentation pickup antenna (not shown) positioned adjacent to the RFID reader antenna 55. The data shown at 73 is at the base of the center-most spectrum 73 (13.56 MHz birdie).

Figure 19:
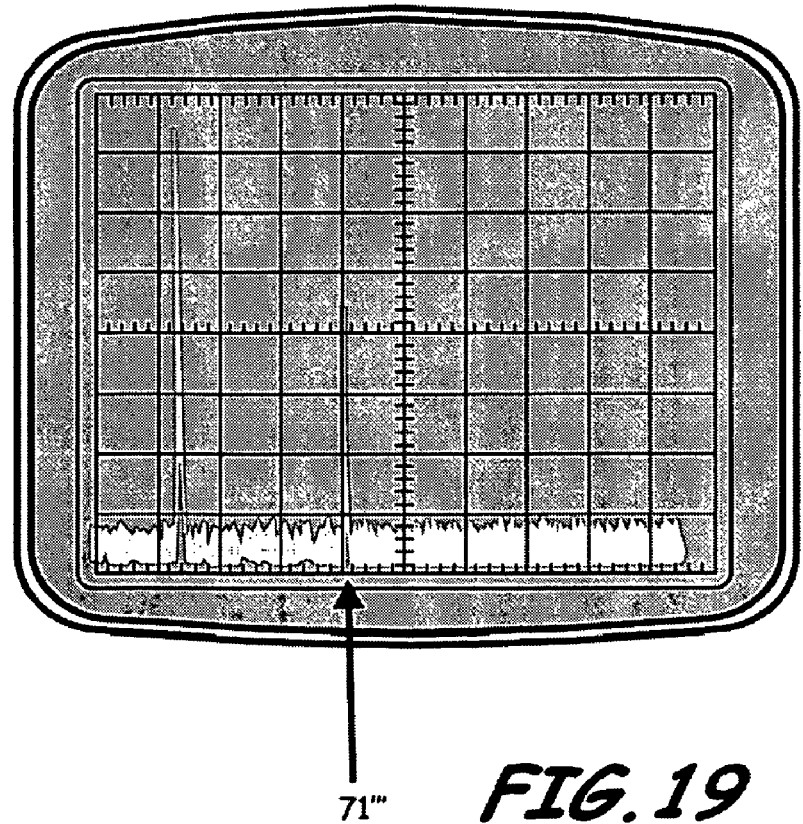
FIG. 19 is an image of a spectrum when an RFID signal capture device is placed adjacent an RFID tag during an attempted interrogation by an RFID reader according to embodiment of the present invention.

FIG. 19 illustrates the spectrum shown at 71''' when the RFID signal capture device 40 is placed on the RFID test device 30 including RFID tag 33. It can be seen that no successful data transfer is present when the RFID signal capture device 40 is next to the RFID device 30 under test (American Express® Blue Card).

Figure 20:
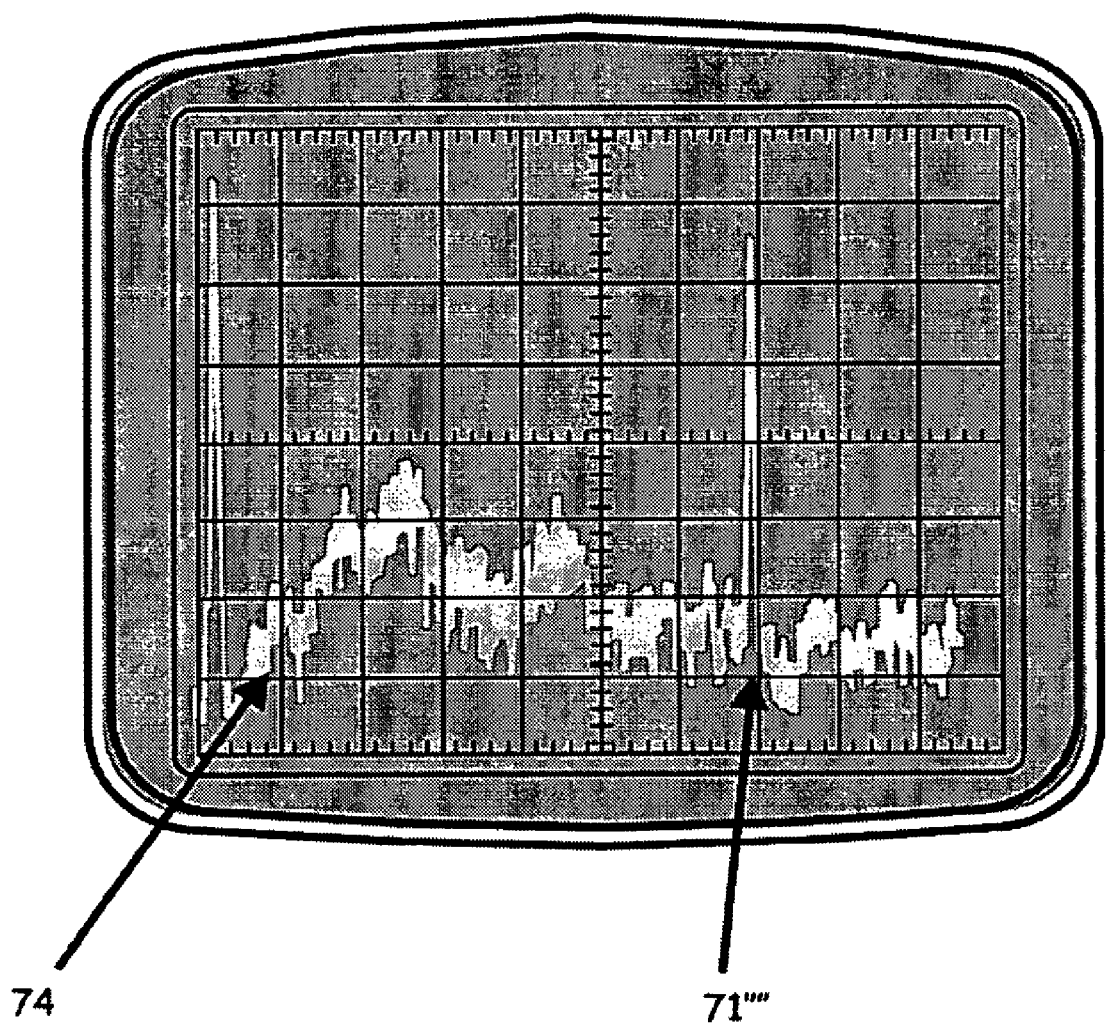
FIG. 20 is an image of a spectrum when an RFID signal capture device and test instrument antenna is placed adjacent an RFID tag during an attempted interrogation by an RFID reader, resulting in a parasitic oscillation.

FIG. 20 illustrates the spectrum shown at 71'''' when the RFID signal capture device 40 and the RFID device 30 under test (containing an RFID tag 33) are placed together with the RFID reader antenna 55 and instrumentation pickup antenna (tuned sampling antenna). The result is parasitic oscillation shown at 74, which are no longer present when the devices 30, 40, are moved approximate 2 inches away from the RFID reader 50, so that the RFID signal capture device 40 cannot couple with the RFID reader antenna 55. Note, the parasitic oscillation may further be the result of the instrumentation pickup antenna being in close proximity to the RFID signal capture device 40.

In summary, it was shown by the testing that the signals created by the RFID signal capture device 40 are parasitic to the RFID tag 33 of the RFID device 30 under test, at least partially as a result of capturing the data signal between the RFID tag 33 and the RFID reader 50 in order to phase cancel the carrier. During the test, the data signals consistently registered at −30 db below the normal signal level of the 13.56 MHz carrier, with a bandwidth of about 1 MHz. The data shown on the display of the spectrum analyzer is from the powered RFID reader 50 and not the RFID tag 33 of the device 30 under test. The signal levels of the RFID tag 33 and the RFID signal capture device 40 (both passive) are so low that they could not be seen without placing the instrumentation pickup antenna directly on top of the devices 30, 40. The addition of a tuned coil antenna into the coupled field caused the signal displayed on the spectrum analyzer to oscillate (over-sample).

As identified previously, the RFID signal capture circuit 43 for the RFID signal capture device 40 is specifically designed to effectively prevent data transfer between an RFID tag (transponder) 33 of an RFID device 30 and a RFID reader 50 attempting an unauthorized interrogation of data from the tag 33, when positioned in close contact with the RFID device 30, to thereby perform various privacy functions including the prevention of unauthorized data access and/or the prevention of tracking the movement of the user of the RFID device 30, while allowing access when not positioned in close contact. To accomplish such functions, the circuit 43 is generally configured: to mutually inductively couple with the RFID tag (or tags) 33 when positioned in close proximity thereto and when the RFID reader 50 is producing an interrogation signal; to mutually inductively couple with the RFID reader 50 when positioned in close proximity to the RFID tag 33 (or at least one of the tags 33, but typically all of the tags 33, if simultaneously protecting multiple tags 33) when the RFID reader 50 is producing an interrogation signal; to mutually inductively couple with the RFID tag or tags 33 when positioned in close proximity to the RFID tag or tags 33 and when the respective RFID tag or tags 33 are producing a reply to interrogation signal in the presence of the RFID reader 50; and to remain inert when not positioned in close proximity to the RFID device (or devices) 30 carrying the RFID tag or tags 33 to not interfere with operation of the RFID reader 50 or the RFID tag or tags 33, i.e., in order to allow the RFID reader 50 to conduct a transaction with the RFID device 30 or a selected one of the RFID devices 30. In order to remain inert when not positioned in close proximity to the RFID device (or devices) 30, beneficially, the device 40 can be configured to have no tuned circuit on the antenna/assembly 45, resulting in a requirement for the device 40 to be inductively coupled with an RFID tag 33 of an RFID device 30 in order to be activated.

FIG. 7 illustrates an example of an embodiment of the RFID signal capture circuit 43 carried by the body 41 of the RFID signal capture device 40 (which can function as a container for the circuit 43). The illustrated RFID signal capture circuit 43 includes a signal capture circuit antenna/assembly 45 as understood by those skilled in the art, positioned to receive an interrogation signal including an interrogation carrier signal carrying a data signal from the RFID reader 50, and a signal processing portion 49 operably coupled thereto. When configured in the form of a passive or partially passive circuit, the signal processing portion 49 of the signal capture circuit 43 can include a voltage rectifier power/data separator, e.g., voltage rectifier 91, as understood by those skilled in the art, positioned to provide operational power to the remainder of the signal processing portion 49 responsive to the interrogation signal. In this configuration, the voltage rectifier 91 is normally in the form of a full wave rectifier to provide the maximum amount of power in the minimum amount of RFID reader signal transmission time. Further, according to a preferred configuration, the circuit 43 does not include a battery or other long-term storage device to power the signal capture circuit 43, and thus, will not transmit without receiving energy from an interrogation signal when coupled with the RFID tag 33.

The signal processing portion 49 of the signal capture circuit 43 can further include a timing synchronizer 93 as would be understood by those skilled in the art, positioned to return a modified carrier signal responsive to the interrogation signal. The modified carrier signal can include a phase-adjusted carrier signal generated in response to the interrogation signal, and/or a synchronized carrier signal generated in response to the interrogation signal, for transmission as either a synchronized signal or phase adjusted signal, for example, by a transistor or amplifier 95 as would be understood by those skilled in the art, coupled with the antenna/assembly 45. When provided as a phase-shifted carrier signal, the phase-shifted carrier signal returned by the timing synchronizer 93 can have a phase shift of at least approximately 90 degrees to that of the interrogation carrier signal, but preferably has a phase shift of approximately 180 degrees, to effectively cancel or at least severely disrupt any attempt by the RFID reader 50 to transfer data to the RFID tag 33.

The signal capture circuit 43 can further include a time/data separator 97 as would be understood by those skilled in the art, positioned to separate the data signal from the interrogation signal to provide the timing synchronizer 93 a timing reference to the interrogation carrier signal to facilitate the phase adjustment and/or synchronization, and a data detector 99 as would be understood by those skilled in the art, positioned to provide the data signal to the timing synchronizer 93 and positioned to facilitate data modulation of the phase-adjusted carrier signal and/or data modulation of the synchronized carrier signal. Beneficially, the data modulated signal can have a different data signal than the data signal received from the RFID reader 50 to thereby further effectively prevent data transfer between the RFID tag 33 and the RFID reader 50. Note, it should be understood by one skilled in the art that although shown as separate functional components, various methodologies of implementing voltage rectifier 91, timing synchronizer 93, transistor or amplifier 95, time/data separator 97, and data detector 99, to include implementation as either separate modules or a single module, is within the scope of the illustrated embodiment of the present invention.

As noted previously, beneficially, the data modulation can include frequency-based data modulation, phase-based data modulation, amplitude-based data modulation, and others known to those skilled in the art, provided to prevent/disrupt the RFID tag 33 from being able to receive or understand a transmission from the RFID reader 50 via the RFID reader circuit 53, and to prevent/disrupt the RFID reader 50 from being able to receive or understand a transmission from the RFID tag 33 if the transmission from the RFID reader circuit 53 was received by the RFID tag 33. Various methods of providing preventive or disruptive phase modulation of the carrier frequency were described above. Preventive or disruptive frequency modulation can be provided by modulating a synchronized carrier frequency to provide different data, such as, for example, random data, or data specifically at odds with the data detected by data detector 99. According to an embodiment of the signal capture circuit 43, both phase and frequency modulation can be simultaneously provided. Note, although the terminology phase modulation and frequency modulation are used, one skilled in the art should understand that such terminology refers to both analog modulation in its various forms, and digital modulation (e.g., phase shift keying, frequency shift keying) in its various forms.

Similarly, preventive or disruptive amplitude modulation in its various forms can be provided by either randomly adjusting the amplitude or adjusting the amplitude based on the data recognized, for example, by the data detector 99. The carrier produced by the RFID reader circuit 53 of the RFID reader 50 produces an AC voltage that is generated by the LC circuit combination of the RFID tag 33 and in the signal capture circuit 43 when inductively coupled with the RFID tag 33 via the signal capture circuit antenna/assembly 45. This voltage is rectified by the voltage rectifier 91 to provide DC voltage to power the rest of the signal capture circuit 43. Note, the analog modulation can be simultaneously provided with phase modulation, frequency modulation, or both.

Figure 8:
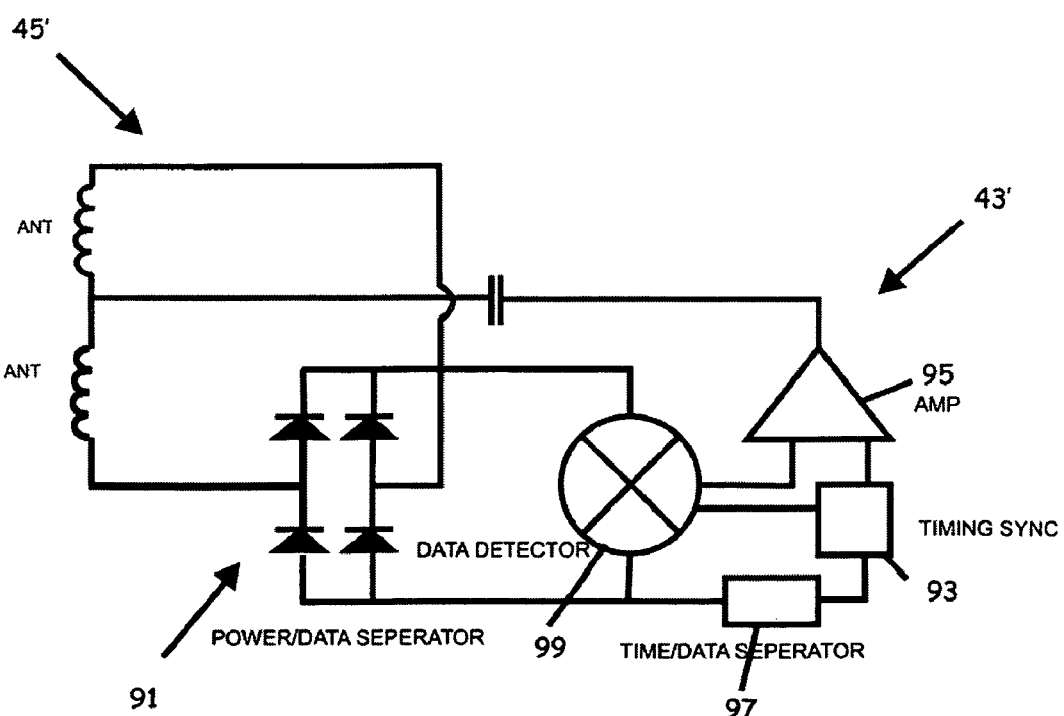
FIG. 8 is a schematic diagram of a signal capture circuit of an RFID signal capture device according to an embodiment of the present invention.

In amplitude shift keying, for example, a transistor or amplifier/amplifier module 95 manipulates the amplitude of the signal to create a logical "one" or "zero." One methodology of amplitude shift keying can include application of a circuit 43' having a tapped antenna coil/assembly 45' as shown, for example, in FIG. 8, connected to a modulation transistor or amplifier 95 so that when the circuit is "on," it effectively lowers the inductance of the antenna coil/assembly 45'. According to this exemplary methodology, when the signal capture circuit 43' is "off," the RFID tag 33 "sees" an inductance and capacitance in parallel tuned to 13.56 MHz in this example. As the data is sent to the RFID tag 33 by the RFID reader circuit 53 of the RFID reader 50, however, the signal capture circuit 43' turns "on" and "off" to produce false data. That is, in this example, when a signal from the RFID reader circuit 53 is applied to the signal capture circuit 43' and the circuit 43' is positioned in close proximity to the RFID tag 33, the LC circuit is tuned and detuned continuously at a rate equal to the frequency of the controlling signal. This control signal is used to alter the data detected in the RFID reader circuit 53 as the amplitude-modulated form of the carrier. If of sufficient strength to be detected by the RFID tag 33, the data detector used by the RFID tag 33 demodulates this false signal to try to extract information being sent from the RFID reader 50, which results in a communication failure between the RFID reader 50 and the RFID device 30.

Another protection methodology that can be employed in conjunction with or as an alternative to the above described modulation forms includes using the carrier frequency of the RFID reader 50 to generate a harmonic frequency, e.g., 6.78 MHz and/or 27.12 MHz for a 13.56 MHz carrier, that is, for example, approximately 70 percent or more in field strength to that of the carrier frequency as seen by the RFID tag 33. This harmonic can be radiated so that the data and timing present on the carrier frequency of the RFID reader 50 are disrupted to the extent that the RFID reader/interrogator 50 is unable to communicate with the protected RFID device 30. That is, since the RFID tag 33 of the RFID device 30 cannot receive the data transmissions, it cannot communicate.

FIGS. 21-24 comparatively illustrate the functioning of the signal capture circuit 43 shown, for example, in FIG. 7. FIG. 21, for example, illustrates a generic example representation of a carrier wave shown at 81 as seen by an RFID tag, e.g., RFID tag 33, which would emanate from the RFID reader 50, and FIG. 23 illustrates an example of the power, timing, and data signals from the RFID reader 50 shown at 82, 83, and 84, respectively. Specifically, FIG. 23 illustrates that an initial portion of the signal from the RFID reader 50 (power portion at 82) would be utilized by a passive RFID tag, e.g. RFID tag 33, to obtain power to begin functioning, followed by a timing portion of the signal at 83, further followed by a validated data portion of the signal at 84, which the RFID tag 33 would need to receive in order to respond to the interrogation.

FIG. 22 comparatively illustrates an example representation shown at 81' of the carrier wave 81 of FIG. 21 being phase and amplitude adjusted as a result of positioning the RFID signal capture device 40 in close proximity to the RFID tag 33, and FIG. 24 comparatively illustrates the insertion of random data shown at 84' beginning during transmission of the "power" signal shown at 82' which affects both the timing and the data signals, thus preventing tag 33 recognizing any data provided by the RFID reader 50 when the RFID signal capture device 40 in close proximity to the RFID tag 33.

Figure 9:
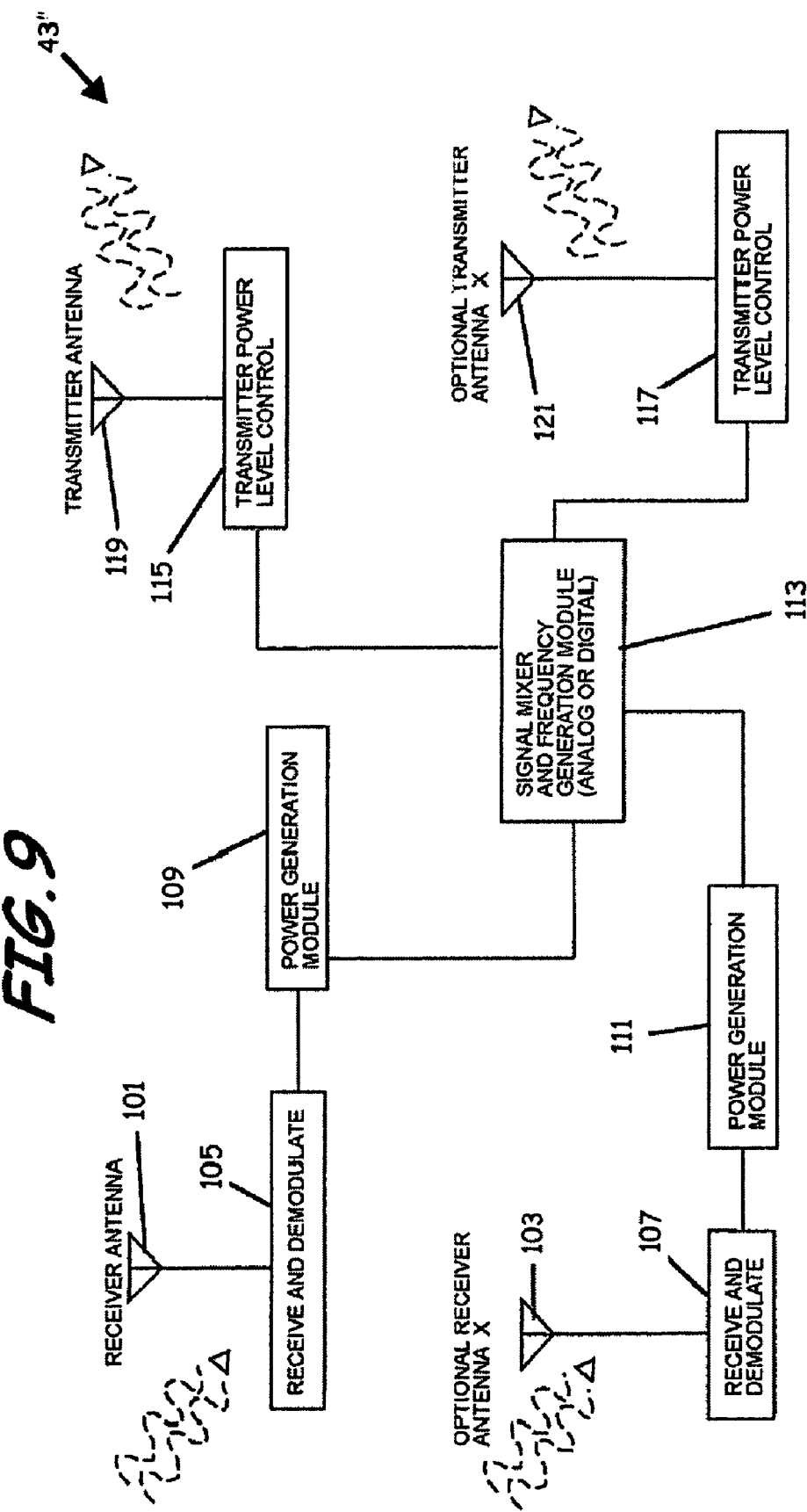
FIG. 9 is a schematic diagram of a signal capture circuit of an RFID signal capture device according to an embodiment of the present invention.

FIG. 9 illustrates another example of an embodiment of the RFID signal capture circuit 43" that can be carried by the body 41 of the RFID signal capture device 40. The illustrated RFID signal capture circuit 43" can include one or more receiver antennas 101, 103, as understood by those skilled in the art, to assist in receiving RFID interrogation signals, a receiver and demodulator 105, 107 to demodulate a received interrogation signal, a power generator module 109, 111, as would be understood by those skilled in the art, to generate power for the RFID signal capture circuit 43" responsive to the received interrogation signal, and a signal mixer and frequency generation module (analog or digital) 1113, as would be understood by those skilled in the art, to mix received signals and generate a frequency signal as understood by those skilled in the art. The circuit 43" can also include, for example, a transmitter power level controller 115, 117 and one or more transmitter antennas 119, 121 to assist with the transmission of the blocking RF fields or zones, as would be understood by those skilled in the art.

An embodiment similar to that of the RFID signal capture circuit 43" described above, can functionally include an incoming signal detector to detect incoming signals from the unauthorized RFID interrogation device or other form of RFID reader 50, an incoming signal demodulator to demodulate a detected incoming signal, and an RFID signal disrupter or disruption circuit configured to respond to the RFID reader 50 with disrupting read signals responsive to the incoming signal, as would be understood by those skilled in the art. The disruption circuit can include various configurations, one of which includes an RFID signal generator as would be understood by those skilled in the art, to generate an RFID signal at the same data rate as the demodulated signal to thereby disrupt the RFID device's ability to communicate with the unauthorized interrogation device or reader 50.

Another similar embodiment of an RFID signal capture device 43" can functionally include an incoming signal detector to detect incoming signals from the unauthorized RFID interrogation device or reader 50 and an RFID interferer configured to interfere with activation or operation ability of the RFID tag 33 of each separate RFID device (or devices) 30 as would be understood by those skilled in the art, responsive to the incoming signal detector so that the RFID reader 50 cannot properly read or have access to information on the RFID device or devices 30. The RFID interferer can also interfere with the RFID device (or devices) 30 (including those having an anti-collision protocol) so that the anti-collision protocol fails to activate.

Alternatively, for example, for an RFID device (or devices) 30 including an anti-collision protocol as understood by those skilled in the art, the RFID interferer interferes with a product of the anti-collision protocol of the separate RFID device (or devices) 30 when being transmitted to the unauthorized RFID reader 50. The RFID interferer, for example, can include a frequency shift generator as would be understood by those skilled in the art, to generate a frequency shift above and below a center frequency of an RFID communication link to each separate RFID device 30.

FIGS. 10-11 illustrate two examples of more detailed antenna arrays (or inductors), capacitors, diodes, and amplifiers arranged as understood by those skilled in the art to prevent data transfer between the RFID reader 50 and the RFID device 30. For example, as understood by those skilled in the art, the signal capture circuit 43, 43', 43", can be in the form of an application specific integrated circuit (ASIC) 131 used to interface and respond to an antenna array in a low power design such as shown in FIG. 10. The low power ASIC 131 can have digital sampling to detect incoming signals from the RFID reader 50 or other interrogation device, and can use various signal generation or frequency generation techniques as understood by those skilled in the art to respond with disruptive patterns.

As understood by those skilled in the art, and as noted above, RFID tags 33 or other circuitry or chips carried by the RFID device 30 often have an anti-collision protocol or program that allow multiple chips to talk to a reader 50. Similarly, the RFID reader circuit 53 may be configured with an anti-collision protocol which can cause the RFID reader 50 to slightly off-tune to acquire the signal from an off-tuned RFID tag 33. Beneficially, the above described techniques can generate an interference with the ability of each RFID tag 33 to activate its onboard anti-collision protocol(s). Depending on the desires of the user of the RFID signal capture device 40: the anti-collision protocol(s) can be stopped before activation; the product or result of the protocol can be attacked or interfaced with during generation or transmission; or both. A frequency, phase, or amplitude shift generation, for example, above and/or below a center frequency of an RFID communication link, can be produced by the signal capture circuit to perform search functions.

Alternatively, an analog or discrete design, such as that shown in FIG. 11, can demodulate the incoming signal from the interrogation device(s), then broadcast back out at that data rate to suppress the ability of the RFID tag 33 of each RFID device 30 to communicate.

As understood by those skilled in the art, these are only a few effective examples according to embodiments of systems, combinations, devices and methods of the present invention, other examples and techniques according to an embodiment of the present invention will be apparent to those skilled in the art.

Figure 25:
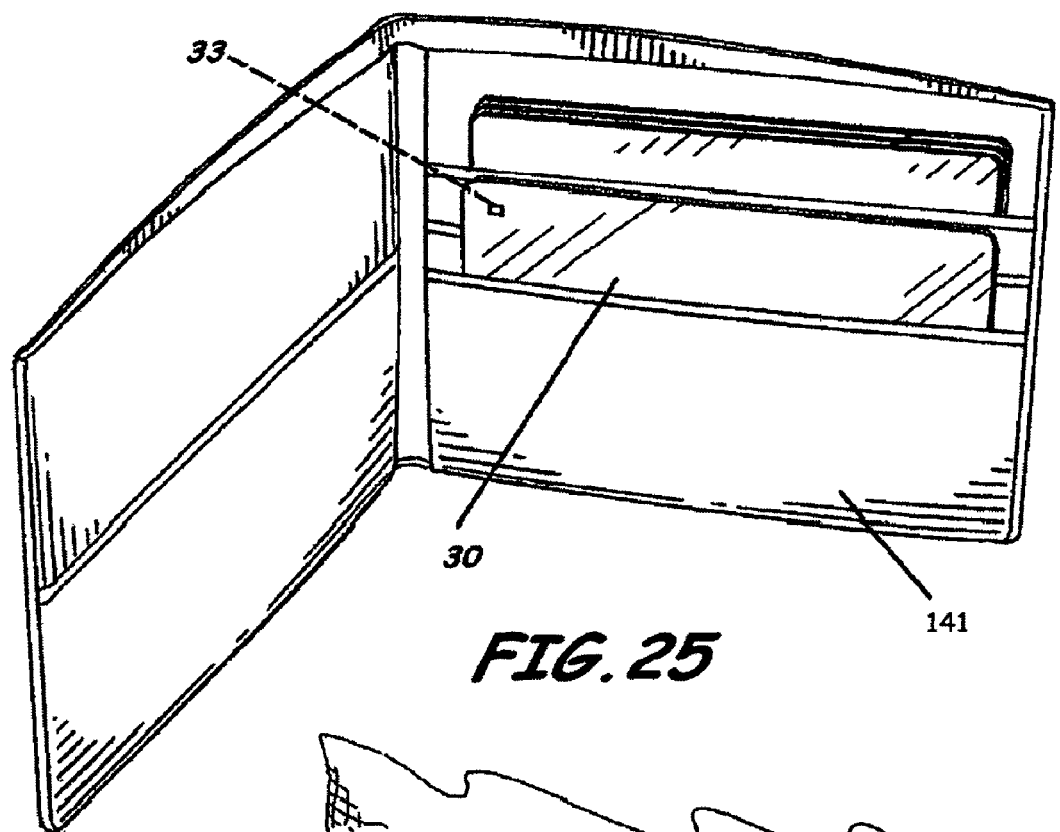
FIG. 25 is a perspective view of an RFID device positioned in a container.
Figure 26:
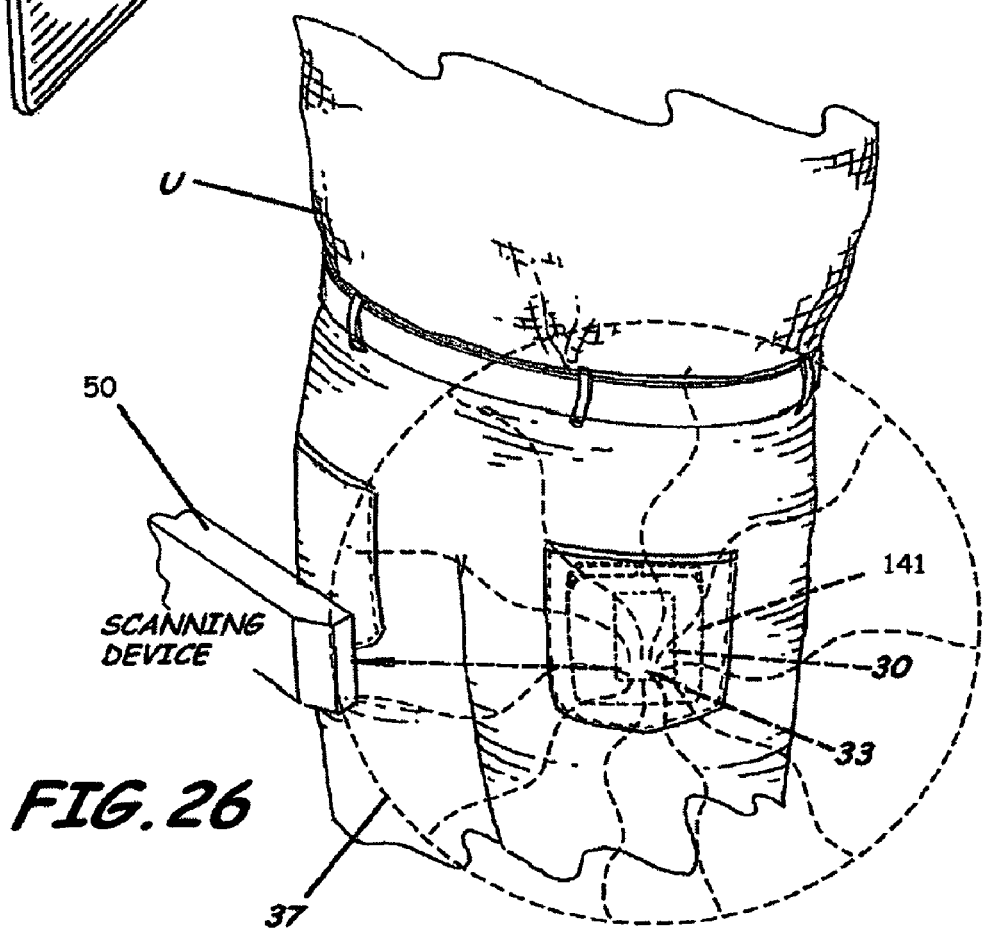
FIG. 26 is a perspective view of an RFID device positioned in a container, positioned in a pocket of a user, and being interrogated by an unauthorized interrogator with an RFID interrogation device.
Figure 27:
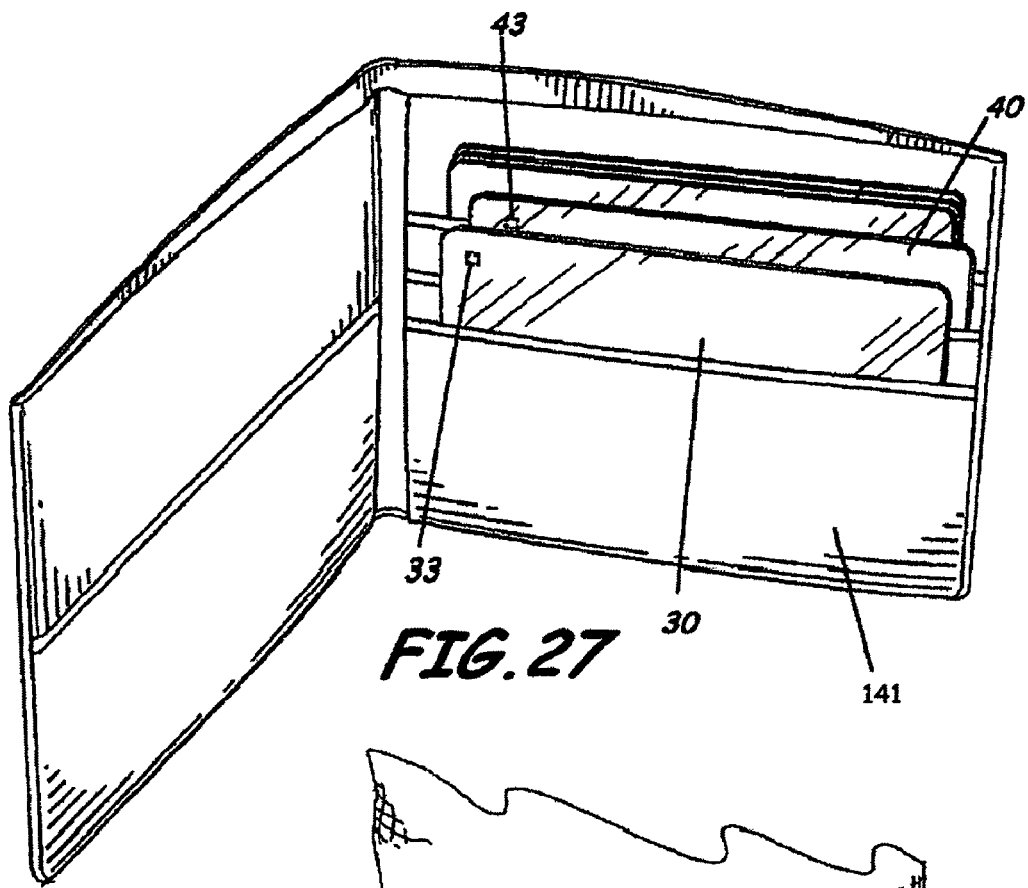
FIG. 27 is a perspective view of a combination of a separate RFID device and a separate RFID signal capture device positioned in a container according to an embodiment of the present invention.

FIGS. 25-26 illustrate an RFID device 30 in the form of a credit/debit card carrying the RFID tag 33 and positioned in a separate container (illustrated in the form of a wallet). As can be seen from the illustrations, when an unauthorized RFID interrogation occurs, i.e., when a scanning device ("interrogation device") or other form reader 50 is positioned within the interrogation response field or e-field 37 of the RFID tag and attempts to read the separate RFID device 30 from within the container 141, the data (e.g., credit/debit card account number, account ID, PIN, or any other data stored on the tag 33) can be readily extracted.

Figure 2:
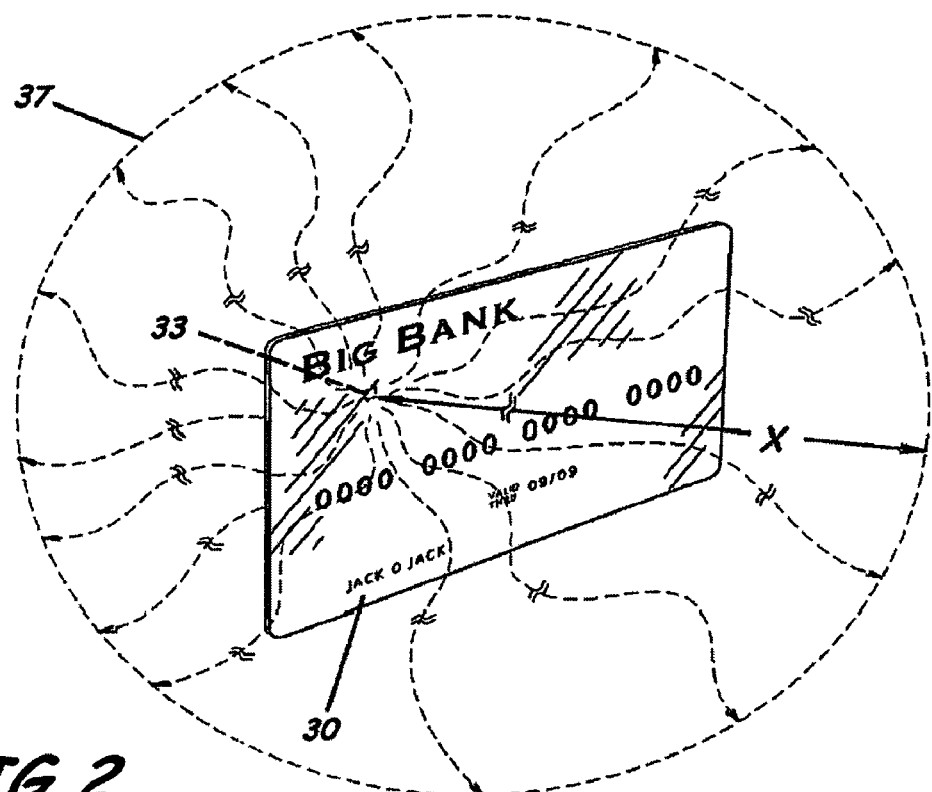
FIG. 2 is a schematic environmental view of a separate RFID device being interrogated by an RFID interrogation device.
Figure 3:
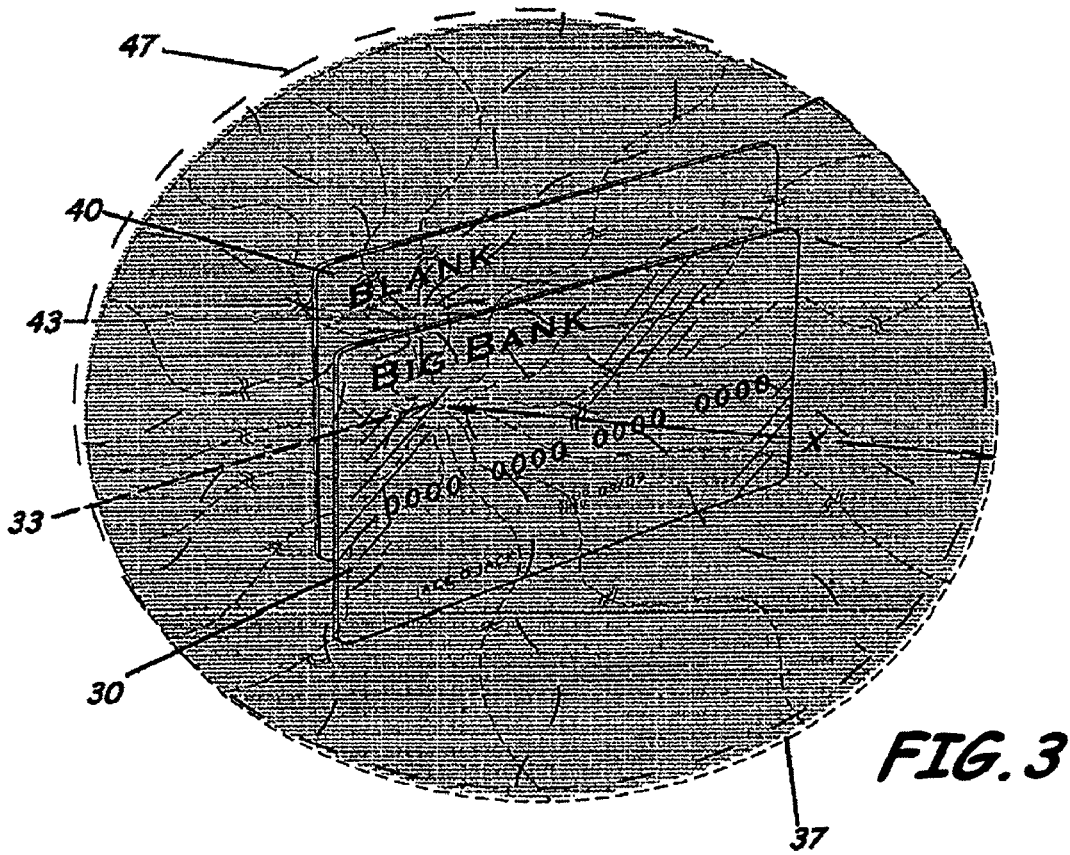
FIG. 3 is a schematic environment view of a combination of a separate RFID device and a separate RFID signal capture device configured to be positioned in a container according to an embodiment of the present invention.
Figure 4:
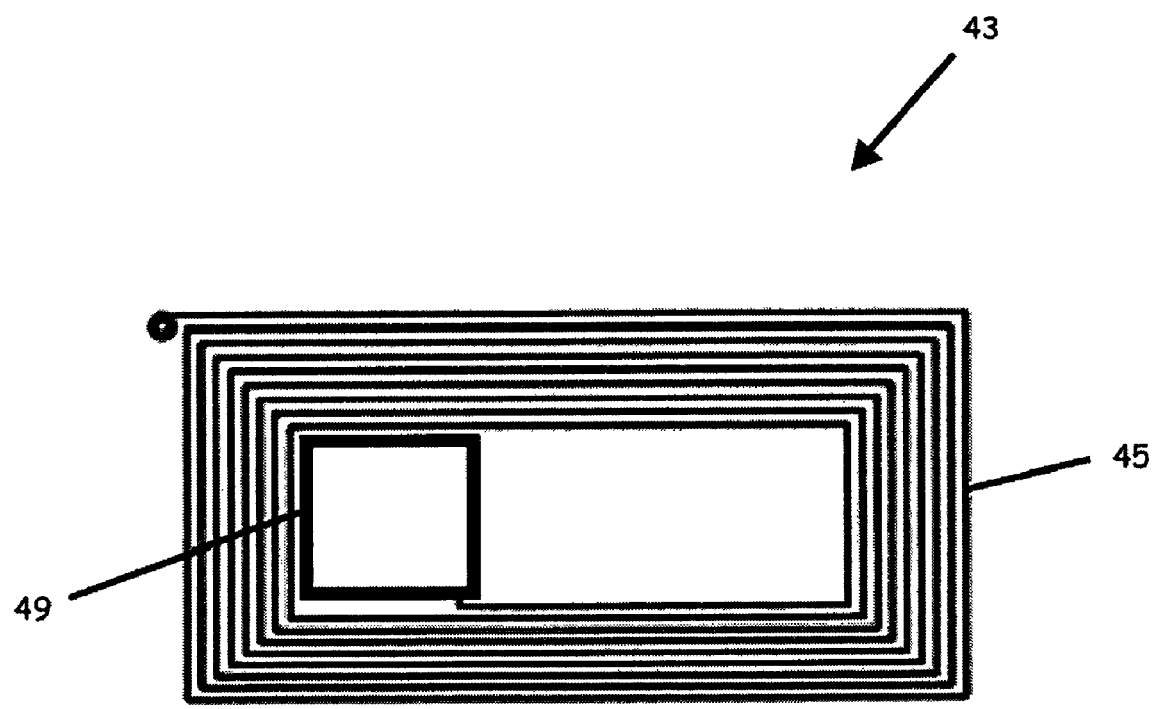
FIG. 4 is a schematic diagram of an RFID signal capture device according to an embodiment of the present invention.

In contrast, FIGS. 27-30, along with FIGS. 1-3, illustrate an example of an embodiment of a combination of the separate RFID device 30 containing a RFID tag 33 and a separate RFID signal capture device 40 containing a signal capture circuit 43, each configured to be positioned separately into, or to be associated with, both the body 41 of the RFID signal capture device 40 functioning as a container 41 carrying the circuit 43, and/or a separate container 141. Accordingly, the combination includes a separate RFID device and/or devices 30 configured to be positioned in the container 141 with a separate RFID signal capture device 40, illustrated in the form of a plastic card similar to a credit card, configured to be positioned adjacent the separate RFID device and/or devices 30 and in the container 141. That is, in the example shown in FIG. 27, the single RFID signal capture device 40 placed in a wallet pocket provides protection to multiple RFID devices 30, simultaneously. Note, in an alternative embodiment of the present invention, the signal capture circuit 43 can be directly embedded within or otherwise carried by the container 141 adjacent to the card carrying portion (e.g., wallet/purse credit card slot, etc.) to allow automatic protection merely by placing the RFID device and/or devices 30 (e.g., credit card(s)) in the appropriate credit card slot, etc., of the container 141.

In operation, when an unauthorized RFID interrogation occurs, i.e., when a scanning device ("interrogation device") or other form reader 50 attempts to read the separate protected RFID device/devices 30 from within the container 141 (see, e.g., FIG. 28), the separate RFID signal capture device 40 positioned adjacent the separate RFID device/devices 30 prevents the attempted interrogation or read. When an authorized user U desires to use one of the separate RFID device 30 for an authorized read, such as an authorized interrogation device 50, the authorized user U can selectively remove either the desired separate RFID device 30 or the separate RFID signal capture device 40 and present the separate RFID device 30 (within or outside of the container as long as sufficiently separated) for the authorized read by an authorized reader 50' (see, e.g., FIG. 29). Note, when the RFID signal capture device 40 is protecting multiple RFID devices 30, a preferred, if not required, procedure would be to remove the desired RFID device 30 to allow an authorized read by an authorized reader (e.g., reader 50' in FIG. 29), while maintaining protection of the remaining RFID devices 30 located, for example, in the container 141.

Note, the container 141 to carry the RFID signal capture device 40, for example, can be in the form of a wallet, a passport, a purse, a folder, a pocket, an envelope, a card holder, a sleeve, and/or a display mount, just to name a few. According to embodiments where the signal capture circuit 43 is directly carried by the container 141, rather than indirectly via a separate container such as, for example, the illustrated body 41 of a plastic card (see, e.g., FIG. 1), the portion of the container 141 carrying the circuit 43 functionally becomes the RFID signal capture device 40 referred to herein. According to such embodiments, the container 141 can also include other items therein, such as other credit or debit cards, money, jewelry, paper or sheets as understood by those skilled in the art. Note also, the container 141 is illustrated in FIGS. 25-30 as a separate holder for credit or debit cards, disembodied from the "plastic card" embodiment shown in FIG. 1 and in FIGS. 25-30. As understood by those skilled in the art, however, numerous other types of containers or configurations are within the scope of the present invention to include a passport and clip or tag for a page in a passport (see, e.g., FIG. 32), and a readily removable clip or tag for a credit or debit card (not shown), just to name a few.

Figure 32:
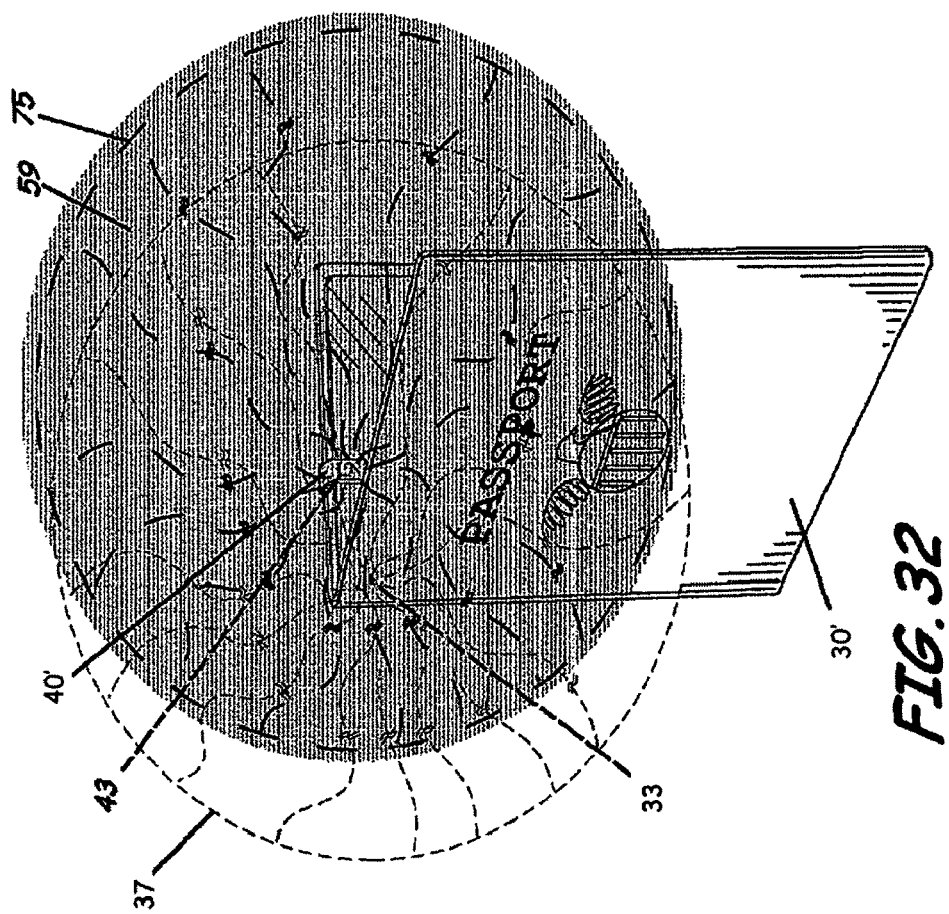
FIG. 32 is a schematic view of a combination of separate RFID device and a separate RFID signal capture device positioned in the container shown in FIG. 31 according to an embodiment of the present invention.
Figure 31:
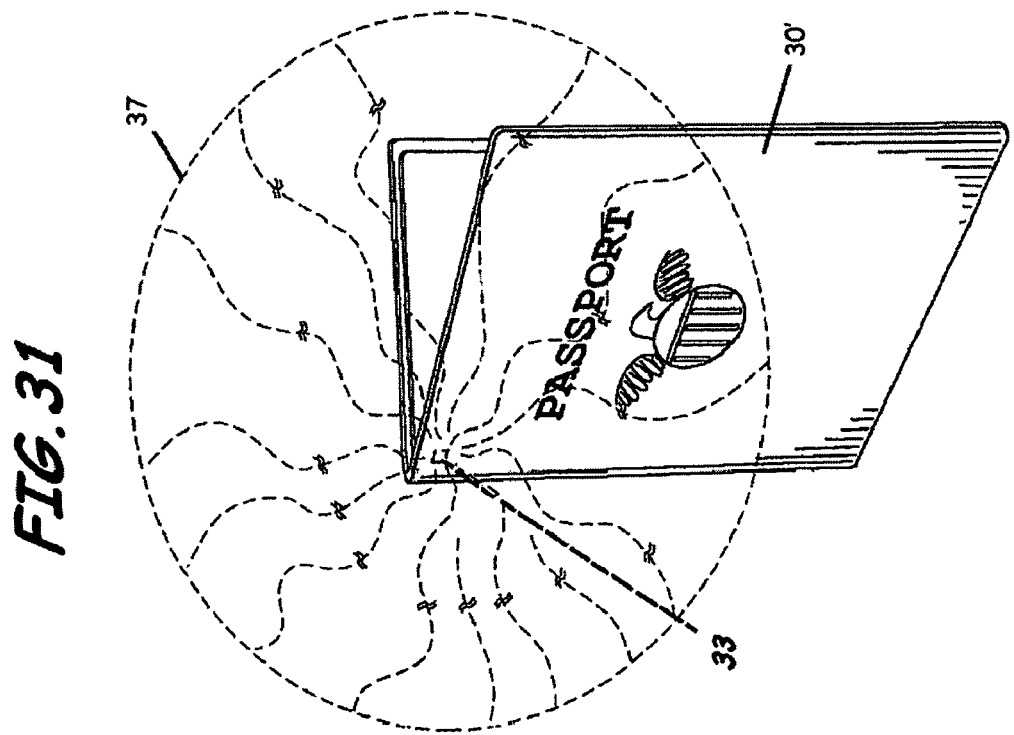
FIG. 31 is a schematic view of an RFID device positioned in a container.
Figure 33:
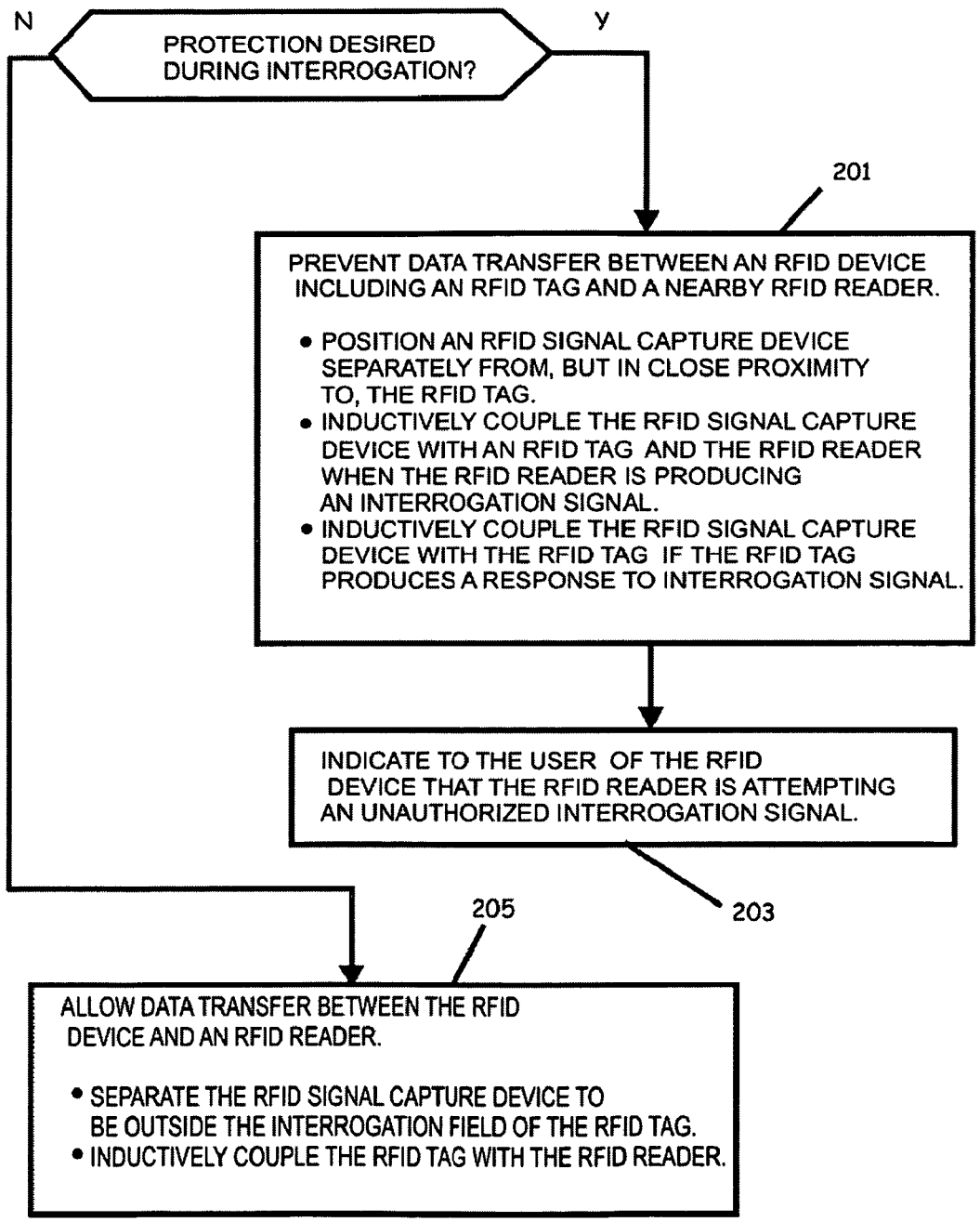
FIG. 33 is a schematic block flow diagram of a method of preventing data transfer between an REID reader and an RFID tag according to an embodiment of the present invention.

As noted above, an RFID device 30, for example, can be a credit card, a debit card, other transaction card (e.g. telephone, gift, electronic, smart) a passport, a passport cover or page, a drivers license, or other device containing an RFID tag 33 as understood by those skilled in the art. FIGS. 1-3 and 25-30 illustrate credit or debit cards as RFID devices 30, and FIGS. 31-32 illustrate passports as RFID devices 30'. These are only for illustrative purposes and many other types of devices having RFID tags 33 associated therewith can be used as well according to an embodiment of the present invention. Similarly, as noted above, an embodiment of a separate RFID signal capture device 40, for example, likewise can be a credit or debit card or other transaction card, tag, clip, sheet, or other device that also has circuitry or a chip 43.

Figure 28:
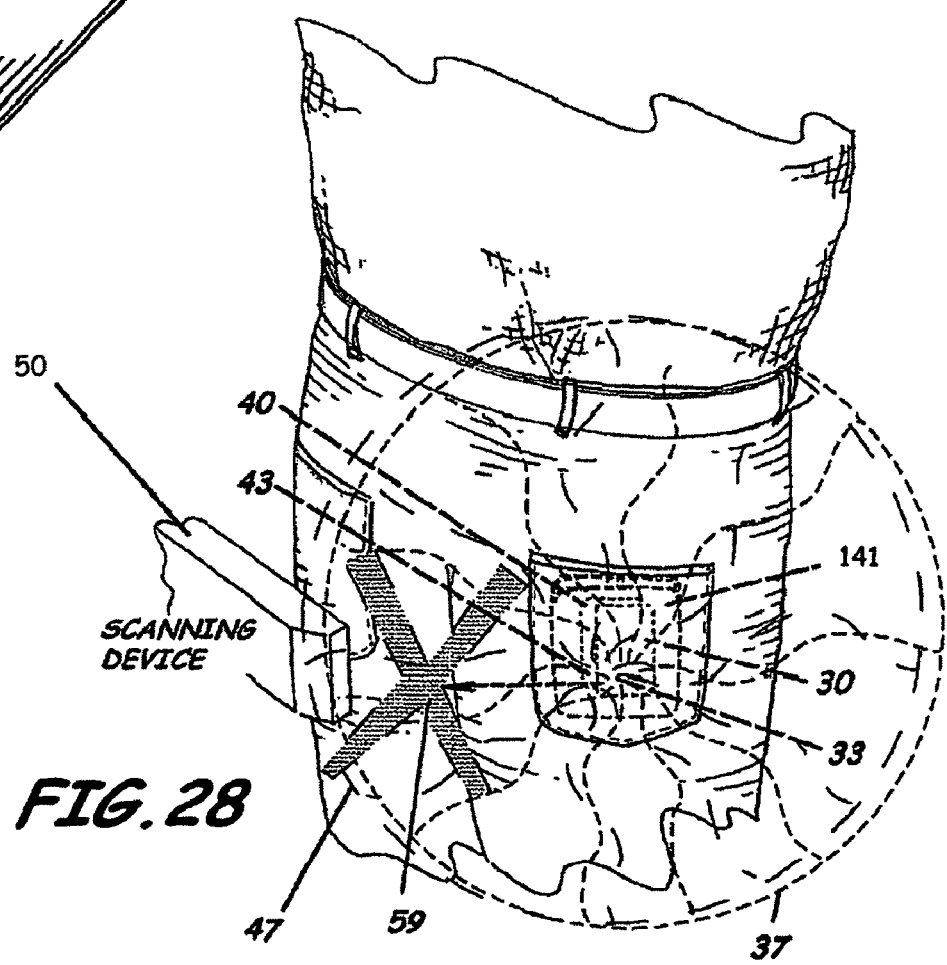
FIG. 28 is an environmental view of the combination of a separate RFID device and a separate RFID signal capture device positioned in a container as illustrated in FIG. 25, positioned in a pocket of an authorized user, and being interrogated by an unauthorized interrogator with an RFID interrogation device according to an embodiment of the present invention.
Figure 29:
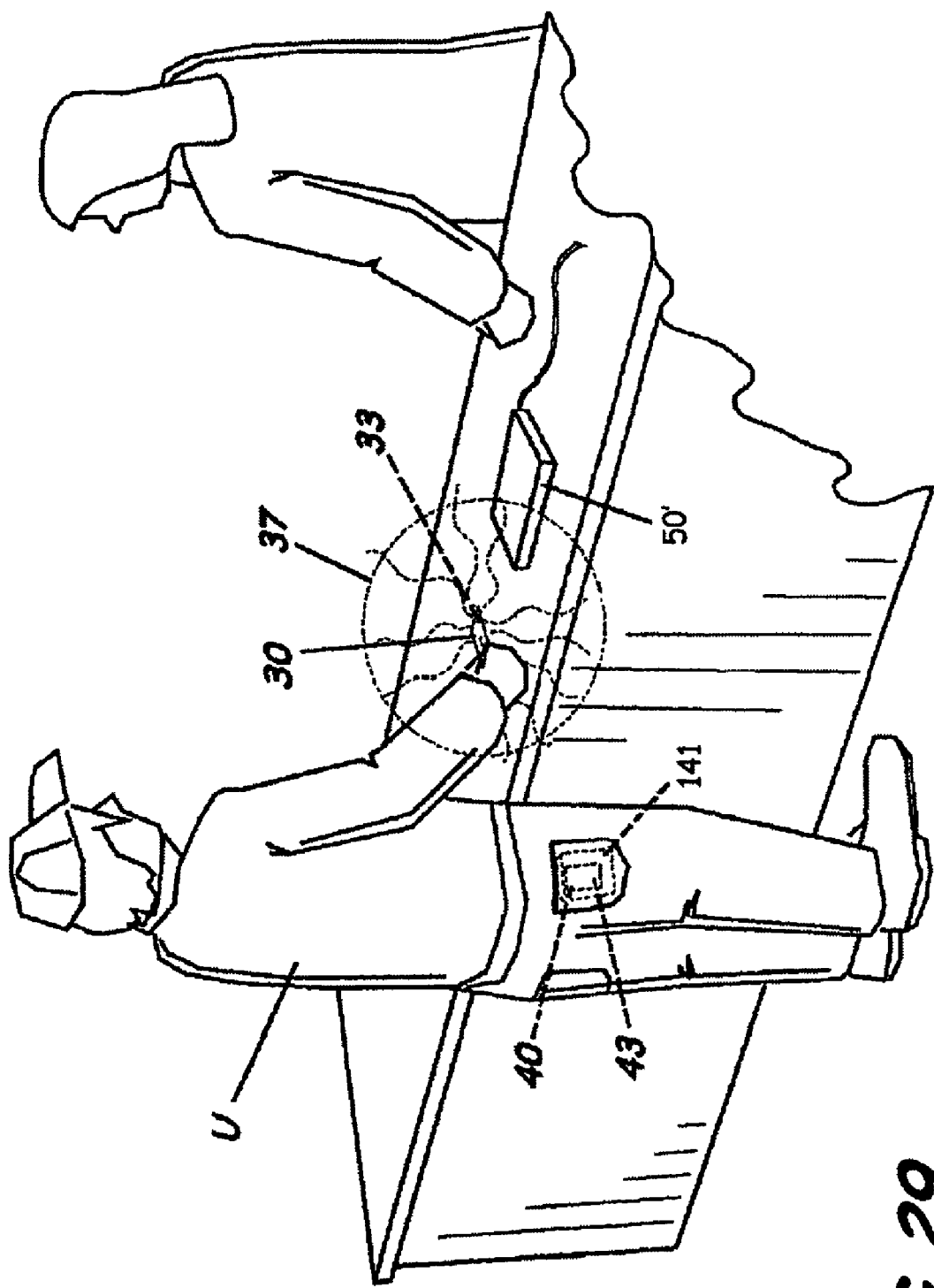
FIG. 29 is an environmental view of an authorized user using a separate RFID device for an authorized RFID read after selective removal of the same from a container having a combination of a separate RFID and a separate RFID signal capture device positioned therein according to an embodiment of the present invention.
Figure 30:
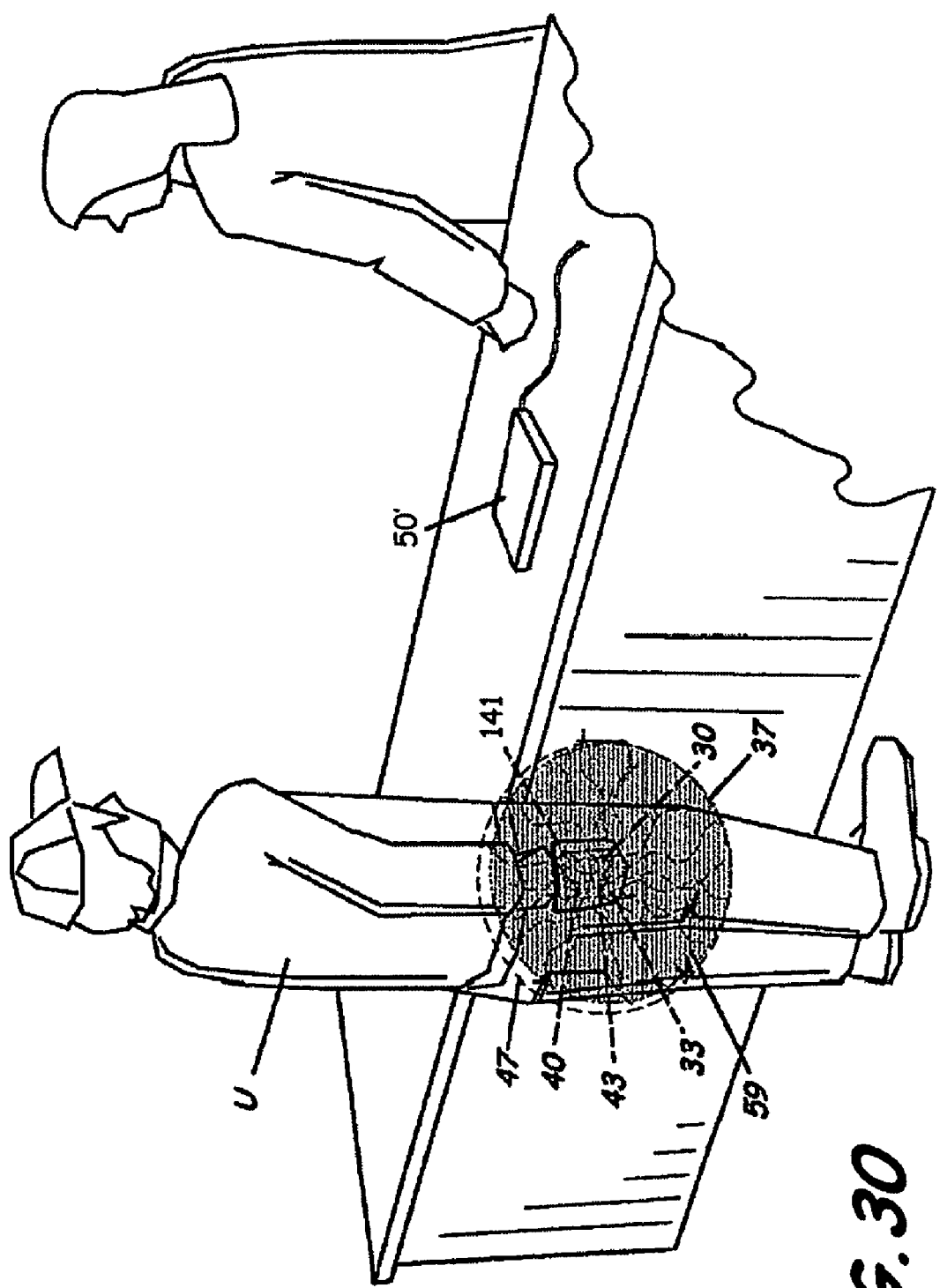
FIG. 30 is an environmental view of a separate RFID device being returned to a container so that the container has a combination of a separate RFID device and a separate RFID signal capture device according to an embodiment of the present invention.

As perhaps best shown in FIGS. 2-3 and 28, an RFID interrogation device or other form of reader 50 can be positioned separate and spaced-apart from an RFID device 30 a selected distance X and an interrogation response field or e-field 37 from the RFID tag 33 of the RFID device 30 can be generated by the RFID device 30 in response to the interrogation. Concurrently, for example, a second e-field 47 can also be generated by the RFID signal capture device 40 in response to the same interrogation to thereby generate a blocking zone 59 such as by disrupting the interrogation signals, interfering with the transmitting signal from the RFID device 30, or other techniques understood by those skilled in the art, including those detailed previously.

Likewise, as shown in FIGS. 31-32, an RFID device 30' such as in the form of a passport or passport cover can have RFID or other contactless circuitry or chip 33 associated therewith and can generate the RF e-field 37 responsive to the interrogation. An RFID or other contactless circuitry signal capture device 40', such as in the form of a tag, clip, or page marker also having the RFID or other contactless blocking circuitry (e.g., signal capture circuit 43, 43', 43"), can be attached to the passport 30', such as one of the pages thereof, to generate an RF blocking field 75 or blocking zone 59, such as described previously.

As illustrated in FIGS. 1-33, embodiments of the present invention also include methods of preventing data transfer between a nearby RFID interrogation device or other reader 50 and an RFID transponder or tag 33 to thereby enhance protection against unauthorized access to RFID or other contactless chip devices, and/or to prevent unauthorized tracking of the user based on the data stored in the tag 33. For example, an embodiment of such a method can include positioning a separate RFID signal capture device 40 adjacent one or more separate RFID devices 30 to block or otherwise prevent RFID interrogation and selectively separating a selected RFID device 30 from the separate RFID signal capture device 40 for authorized interrogation of the selected RFID device 30. The positioning, for example, can include either the separate RFID signal capture device 40 or the separate one or more RFID devices 30 being in a container 141 prior to positioning the separate RFID signal capture device 40, adjacent the separate one or more RFID devices 30. The prevented or otherwise disrupted RFID interrogation can include an unauthorized RFID interrogation. The container 141, for example, can include a wallet, a passport, a purse, a folder, a pocket, an envelope, a sleeve, a card holder, and a display mount. The blocking/prevention of the RFID interrogation, for example, can interfere with the activation of an anti-collision protocol associated with each separate RFID device 30 or interfere with the transmission of an anti-collision protocol associated with each separate RFID device 30, for example. Alternatively, the blocking/prevention of the RFID interrogation can include providing disrupting read signals responsive to an attempted interrogation of the separate one or more RFID devices 30. Note, one of ordinary skill in the art would understand that the components and methods described with respect to each respective RFID device 30 are equally applicable to RFID device 30' shown, for example, in FIG. 31.

Another embodiment of a method of enhanced protection against unauthorized interrogation of a contactless circuiting device includes positioning a separate contactless signal capture device (e.g., RFID signal capture device 40, 40') in association with a container and adjacent each separate contactless circuitry device to be protected (e.g., RFID device 30, 30') to thereby block or otherwise prevent unauthorized interrogation of the separate contactless circuitry device/devices, and selectively separating a separate contactless circuitry device from being adjacent the separate contactless signal capture device for authorized interrogation of the separate contactless circuitry device. Contactless circuitry of the separate contactless circuitry device to be protected, for example, can be in the form of various contactless devices to include RFID, Bluetooth, WI-FI, radio frequency microwave frequency, cellular frequency, global positioning system, and optical/infrared (with some modifications).

Another embodiment of a method of preventing data transfer between a nearby RFID reader 50 and an RFID transponder "tag" 33 containing data to be protected generally carried by an RFID device 30, 30', can include the steps of inductively coupling an RFID signal capture device 40, 40', with the RFID tag 33 and the RFID reader 50 to thereby effectively prevent data transfer between the RFID tag 33 and the nearby RFID reader 50 when the RFID signal capture device 40, 40', is positioned by a user in close proximity to the RFID tag 33 and when the RFID reader 50 is producing an interrogation signal (block 201). The step of preventing data transfer can also include inductively coupling the RFID signal capture device 40, 40', with the RFID tag 33 when positioned in close proximity to the RFID tag 33 and when the RFID tag 33 is producing a reply to an interrogation signal. This step can also include preventing data transfer between the RFID reader 50 and multiple protected RFID tags 33, simultaneously, to include inductively coupling the RFID signal capture device 40, 40', with at least one, but preferably each of the protected RFID tags 33 when positioned in close proximity to the RFID tags 33, such as, for example, when placed together in a credit card section of a wallet/purse, etc., and when the respective RFID tags 33 are being interrogated with an interrogation signal and/or producing a reply to the interrogation signal.

A method can also include indicating to the user of the RFID tag 33 that the RFID reader 50 is attempting to interrogate the RFID tag 33 (or tags 33 if multiple are being protected) when the RFID reader 50 is producing the interrogation signal and when the RFID signal capture device 40, 40', is in close proximity to the RFID tag 33 (block 203). Accordingly, the step of indicating to the user of the RFID tag 33 that the RFID reader 50 is attempting to interrogate the RFID tag 33 can include illuminating a visual indicator 68 carried by the RFID signal capture device 40, 40', and/or sounding an audible indicator 68 carried by the RFID signal capture device 40, 40'. Note, the RFID signal capture device 40, 40', can be configured so that such indication is not provided when the RFID signal capture device 40, 40', is not in close proximity to the RFID tag 33.

The method can also include allowing data to transfer between the RFID device 40, 40', and an RFID reader 50 by selectively substantially separating the RFID signal capture device 40, 40', from being adjacent the RFID tag 33 to allow authorized interrogation of the RFID tag 33 (block 205). Accordingly, the RFID signal capture device 40, 40', can be configured to not interfere with operation of the RFID reader 50 when the RFID signal capture device 40, 40', is not positioned in close proximity to an RFID tag 33. Further, according to a preferred configuration, the RFID signal capture device 40, 40' is generally adapted to provide a visual or audible indication of an interrogation signal when positioned sufficiently close to the RFID reader 50, regardless of its position with respect to the RFID device 30, 30'. Still further, the RFID signal capture device 40, 40', can alternatively be configured to provide a visual or audible indication of data transfer when the RFID signal capture device 40, 40', is not positioned in close proximity to the RFID tag 33 so as not to disrupt communication between the RFID device 30, 30', and the RFID reader 50 as long as the REID signal capture device 40, 40', is positioned sufficiently close to the RFID reader 50.

This application is related to U.S. patent application Ser. No. 11/581,896, filed Oct. 17, 2006, titled "RFID Protection System, Device, Combination, and Related Methods," which claims the priority to and the benefit of U.S. Provisional Patent Application No. 60/731,750, filed Oct. 31, 2005, titled "RFID Protection System, Device, Combination, and Related Methods," each incorporated herein by reference in its entirety.

In the drawings and specification, there have been disclosed a typical preferred embodiment of the invention, and although specific terms are employed, the terms are used in a descriptive sense only and not for purposes of limitation. The invention has been described in considerable detail with specific reference to these illustrated embodiments. It will be apparent, however, that various modifications and changes can be made within the spirit and scope of the invention as described in the foregoing specification. For example, the above and exemplary embodiments generally referred to RFID transponders/tags functioning at 13.56 MHz, it should be understood that applications according to other frequencies such as, for example, 900 MHz, and others, are within the scope of the present invention. Also, for example, although primarily described with respect to a single RFID tag 33 on a single RFID device, applications of the RFID signal capture device 40, 40' include those to not only protect a single RFID device 30, 30' carrying a single RFID tag 33, or multiple RFID devices 30, 30' each carrying a separate single independent RFID tag 33, but also single or multiple RFID devices 30, 30', each carrying multiple RFID tags 33, having an anti-collision protocol and/or tuned for different frequencies.

That claimed is:

1. A radio frequency identification (RFID) signal capture device to prevent data transfer between a nearby RFID reader and at least one RFID device including one or more RFID transponders storing data and configured to inductively couple with the RFID reader to provide data thereto when interrogated therewith, the RFID signal capture device comprising:
    a container;
    a signal capture circuit carried by the container and configured to mutually inductively couple with the one or more RFID transponders when positioned in close proximity to the one or more RFID transponders, when the RFID reader is producing an interrogation signal of sufficient strength to interrogate the one or more RFID transponders, and when the one or more RFID transponders is producing a reply to the interrogation signal responsive to an interrogation by the RFID reader, to thereby effectively prevent data transfer between the one or more RFID transponders and the RFID reader, the signal capture circuit also being configured so that when the RFID signal capture device is not positioned in close proximity to the one or more RFID transponders, the RFID signal capture circuit will not inductively couple with either of the following: the RFID reader and the one or more RFID transponders, the signal capture circuit including:
        a signal capture circuit antenna assembly positioned to receive the interrogation signal from the RFID reader, the interrogation signal including an interrogation carrier signal carrying a data signal, and
        a timing synchronizer positioned to return a modified carrier signal responsive to the interrogation signal to thereby effectively prevent data transfer between the RFID reader and the one or more RFID transponders; and
    an interrogation indicator carried by the container and configured to indicate to a user of the at least one RFID device including the one or more RFID transponders when the RFID reader is producing the interrogation signal of sufficient strength to interrogate the one or more RFID transponders, the interrogator indicator including:
        an interrogation indicator antenna positioned to receive the interrogation signal from the RFID reader, and
        an indicator comprising one or more of the following types of indicators: an audible indicator and a visual indicator, configured to indicate to the user of the one or more RFID transponders that the RFID reader is attempting to interrogate the one or more RFID transponders when the RFID signal capture device is positioned in close proximity to the one or more RFID transponders and when the RFID reader is producing the interrogation signal of sufficient strength to interrogate the one or more RFID transponders.

2. A device as defined in claim 1,
    wherein the signal capture circuit also is configured so that when the RFID signal capture device is not positioned in close proximity to an RFID transponder, the RFID signal capture circuit will not interfere with operation of the RFID reader.

3. A device as defined in claim 1,
    wherein the signal capture circuit antenna assembly comprises an un-tuned signal capture circuit antenna assembly having an un-tuned signal capture circuit antenna;
    wherein the one or more RFID transponders comprise a plurality of RFID transponders each positioned in close proximity to the un-tuned signal capture circuit antenna of the signal capture circuit when the RFID signal capture device is operably positioned to protect the plurality of RFID transponders so that the un-tuned signal capture circuit antenna is within an interrogation response field range of each of the plurality of RFID transponders;

wherein each of the plurality of RFID transponders store one or more of the following types of data: unique personal data, a unique indicator usable to access personal data, unique financial data, and a unique indicator usable to access financial data;

wherein the at least one RFID device includes a plurality of RFID devices each carrying a separate one or more of the plurality of RFID transponders; and wherein the signal capture circuit is adapted to mutually inductively couple with both the RFID reader and at least one of the plurality of RFID transponders responsive to being positioned in close proximity to the at least one of the plurality of RFID transponders and responsive to the RFID reader producing an interrogation signal of sufficient strength to interrogate the at least one of the plurality of RFID transponders to disrupt an interrogation response field associated with the at least one of the plurality of transponders to thereby effectively prevent data transfer between the RFID reader and each of the plurality of RFID transponders.

4. A device as defined in claim 3, wherein the signal capture circuit is adapted to simultaneously mutually inductively couple with each of the plurality of RFID transponders responsive to being positioned in close proximity to each of the plurality of RFID transponders so that the un-tuned signal capture circuit antenna is within an interrogation response field range of each of the plurality of RFID transponders, and responsive to each of the RFID transponders separately producing a reply to the interrogation signal to thereby effectively prevent data transfer between each of the plurality of RFID transponders and the RFID reader when the interrogation signal is insufficiently disrupted and data carried in the interrogation signal is received by the plurality of RFID transponders.

5. A device as defined in claim 1, wherein the modified carrier signal returned by the timing synchronizer includes a phase-adjusted carrier signal responsive to the interrogation signal to thereby effectively prevent data transfer between the RFID reader and the one or more RFID transponders.

6. A device as defined in claim 5, wherein the signal capture circuit further comprises a data separator positioned to separate the data signal from the interrogation signal to provide the timing synchronizer a reference to the interrogation carrier signal to thereby facilitate the phase adjustment; and wherein the phase-shifted carrier signal returned by the timing synchronizer has a phase shift of at least approximately 90 degrees to that of the interrogation carrier signal to thereby effectively prevent the data transfer between the RFID reader and the one or more RFID transponders.

7. A device as defined in claim 6, wherein the interrogation indicator further comprises a voltage rectifier positioned to provide operational interrogation indicator power responsive to the interrogation signal;

wherein the signal capture circuit further comprises a voltage rectifier positioned to provide operational signal capture circuit power responsive to the interrogation signal; and wherein the RFID signal capture device does not include a battery to power the signal capture circuit.

8. A device as defined in claim 6, wherein the phase-shifted carrier signal has a phase shift of approximately 180 degrees to that of the interrogation carrier signal.

9. A device as defined in claim 6, wherein the signal capture circuit further includes:

a data detector positioned to provide the data signal to the timing synchronizer and positioned to facilitate data modulation of the phase-adjusted carrier signal, the data modulated signal having a different data signal than the data signal received from the RFID reader to thereby further effectively prevent data transfer between the one or more RFID transponders and the RFID reader, the data modulation comprising one or more of the following: frequency-based data modulation, phase-based data modulation, and amplitude-based data modulation.

10. A device as defined in claim 1, wherein the signal capture circuit further includes:

a data detector positioned to provide the data signal to the timing synchronizer and positioned to facilitate data modulation of the synchronized carrier signal, the data modulation having a different data signal than the data signal received from the RFID reader to thereby further effectively prevent data transfer between the one or more RFID transponders and the RFID reader, the data modulation comprising one or more of the following: frequency-based data modulation, phase-based data modulation, and amplitude-based data modulation.

11. A device as defined in claim 1, wherein the modified carrier signal returned by the timing synchronizer includes a carrier signal responsive to the interrogation signal to thereby effectively prevent data transfer between the RFID reader and the one or more RFID transponders; and wherein the signal capture circuit further includes a data separator positioned to separate the data signal from the interrogation signal to provide the timing synchronizer a reference to the interrogation carrier signal.

12. A radio frequency identification (RFID) signal capture device to prevent data transfer between a nearby RFID reader and an RFID device including an RFID transponder storing data and configured to inductively couple with the RFID reader to provide data thereto when interrogated therewith, the RFID signal capture device comprising:

a container;

a signal capture circuit carried by the container and configured to mutually inductively couple with the RFID transponder when positioned in close proximity to the RFID transponder, when the RFID reader is producing an interrogation signal of sufficient strength to interrogate the RFID transponder, and when the RFID transponder is producing a reply to the interrogation signal, to thereby effectively prevent data transfer between the RFID transponder and the RFID reader, the signal captured circuit also being configured so that when the RFID signal capture device is not positioned in close proximity to the RFID transponder, the RFID signal capture circuit will not inductively couple with either of the following: the RFID reader and the RFID transponder; and an interrogation indicator carried by the container and configured to indicate to a user of the RFID device that the RFID reader is attempting to interrogate the RFID transponder when the RFID signal capture device is positioned in close proximity thereto and when the RFID reader is producing the interrogation signal of sufficient strength to interrogate the RFID transponder.

13. A device as defined in claim 12, wherein the signal capture circuit also is configured so that when the RFID signal capture device is not positioned in close proximity to the RFID transponder, the RFID signal capture circuit will not interfere with operation of the RFID reader.

14. A device as defined in claim 12, wherein the interrogation indicator comprises:
   an antenna positioned to receive an interrogation signal from the RFID reader;
   a voltage rectifier positioned to provide operational interrogator indicator circuit power to the interrogation indicator responsive to the interrogation signal when the RFID signal capture device is positioned in close proximity to the RFID reader and when the RFID reader is producing the interrogation signal of sufficient strength to interrogate the RFID transponder; and
   an audible indicator adapted to indicate to the user of the RFID transponder that the RFID reader is attempting to interrogate the RFID transponder when the RFID signal capture device is positioned in close proximity to the RFID transponder and when the RFID reader is producing the interrogation signal of sufficient strength to interrogate the RFID transponder.

15. A device as defined in claim 12, wherein the interrogation indicator comprises:
   an antenna positioned to receive an interrogation signal from the RFID reader;
   a voltage rectifier positioned to provide operational interrogator indicator circuit power to the interrogation indicator responsive to the interrogation signal when the RFID signal capture device is positioned in close proximity to the RFID reader and when the RFID reader is producing the interrogation signal of sufficient strength to interrogate the RFID transponder; and
   a visual indicator adapted to indicate to the user of the RFID transponder that the RFID reader is attempting to interrogate the RFID transponder when the RFID signal capture device is positioned in close proximity to the RFID transponder and when the RFID reader is producing the interrogation signal of sufficient strength to interrogate the RFID transponder to thereby alert the user of the attempted interrogation.

16. A device as defined in claim 12, wherein the signal capture circuit comprises:
   a signal capture circuit antenna positioned to receive an interrogation signal from the RFID reader, the interrogation signal comprising a modulated interrogation carrier signal carrying a data signal; and
   a timing synchronizer positioned to return a phase-adjusted carrier signal responsive to the interrogation signal to thereby effectively prevent data transfer between the RFID reader and the RFID transponder.

17. A device as defined in claim 16,
   wherein the signal capture circuit further comprises a data separator positioned to separate the data signal from the interrogation signal to provide the timing synchronizer a reference to the interrogation carrier signal to facilitate the phase adjustment; and
   wherein the phase-shifted carrier signal returned by the timing synchronizer has a phase shift of at least approximately 90 degrees to that of the interrogation carrier signal to thereby effectively prevent the data transfer between the RFID reader and the RFID transponder.

18. A device as defined in claim 17,
   wherein the phase-shifted carrier signal has a phase shift of approximately 180 degrees to that of the interrogation carrier signal;
   wherein the signal capture circuit further comprises a voltage rectifier positioned to provide operational signal capture circuit power responsive to the interrogation signal; and
   wherein the RFID signal capture device does not include a battery to power the signal capture circuit.

19. A device as defined in claim 17, wherein the signal capture circuit further comprises:
   a data detector positioned to provide the data signal to the timing synchronizer and positioned to facilitate data modulation of the phase-adjusted carrier signal, the data modulated signal having a different data signal than the data signal received from the RFID reader to thereby further effectively prevent data transfer between the RFID transponder and the RFID reader, the data modulation comprising one or more of the following: frequency-based data modulation, phase-based data modulation, and amplitude-based data modulation.

20. A device as defined in claim 12, wherein the signal capture circuit comprises:
   a signal capture circuit antenna positioned to receive an interrogation signal from the RFID reader, the interrogation signal including an interrogation carrier signal carrying a data signal;
   a timing synchronizer positioned to return a modulated carrier signal responsive to the interrogation signal to thereby effectively prevent data transfer between the RFID reader and the RFID transponder; and
   a data detector positioned to provide the data signal to the timing synchronizer to facilitate data modulation of the synchronized carrier signal, the data modulation having a different data signal than the data signal received from the RFID reader to thereby further effectively prevent data transfer between an RFID transponder and the RFID reader, the data modulation comprising one or more of the following: frequency-based data modulation, phase-based data modulation, and amplitude-based data modulation.

21. A device as defined in claim 12, wherein the signal capture circuit further comprises:
   a signal capture circuit antenna positioned to receive an interrogation signal from the RFID reader, the interrogation signal including an interrogation carrier signal carrying a data signal;
   a timing synchronizer positioned to return a carrier signal responsive to the interrogation signal to thereby effectively prevent data transfer between the RFID reader and the RFID transponder; and
   a data separator positioned to separate the data signal from the interrogation signal to provide the timing synchronizer a reference to the interrogation carrier signal.

22. A device as defined in claim 12, wherein the signal capture circuit comprises an un-tuned signal capture circuit antenna to mutually inductively couple with both the RFID reader and at least one of a plurality of RFID transponders responsive to being positioned in close proximity thereto and responsive to the RFID reader producing an interrogation signal of sufficient strength to interrogate the at least one of the plurality of RFID transponders to disrupt an interrogation response field associated with the at least one of the plurality of transponders to thereby effectively prevent data transfer between each of the plurality of RFID transponders and the RFID reader, the plurality of RFID transponders each positioned in close proximity to the un-tuned signal capture circuit antenna of the signal capture circuit when the RFID signal capture device is operably positioned to protect the plurality of RFID transponders so that the un-tuned signal capture circuit antenna is within an interrogation response field range of each of the plurality of RFID transponders.

23. A device as defined in claim 12, wherein the signal capture circuit comprises:
- a signal capture circuit antenna assembly including a signal capture circuit antenna positioned to receive an interrogation signal from the RFID reader when the signal capture circuit is positioned in close proximity to the RFID transponder and when the RFID reader is producing the interrogation signal of sufficient strength to interrogate the RFID transponder, the interrogation signal comprising a modulated interrogation carrier signal carrying a data signal, the signal capture circuit antenna assembly being not tuned to prevent operational activation affecting the RFID reader when not employed to protect an RFID transponder;
- a timing synchronizer positioned to return a phase-adjusted carrier signal responsive to the interrogation signal, the phase-shifted carrier signal having a phase shift of approximately 180 degrees to that of the interrogation carrier signal;
- a data separator positioned to separate the data signal from the interrogation signal to provide the timing synchronizer a reference to the interrogation carrier signal to facilitate the phase adjustment;
- a data detector positioned to provide the data signal to the timing synchronizer and positioned to facilitate data modulation of the phase-adjusted carrier signal, the data modulated phase-adjusted signal having a different data signal than the data signal included in the interrogation signal, the data modulation comprising one or more of the following: frequency-based data modulation, phase-based data modulation, and amplitude-based data modulation;
- a voltage rectifier positioned to provide operational signal capture circuit power responsive to the interrogation signal when the RFID signal capture device is positioned in close proximity to the RFID transponder and when the RFID reader is producing the interrogation signal of sufficient strength to interrogate the RFID transponder; and
- an amplifier positioned to receive the phase-adjusted carrier signal from the timing synchronizer to provide the phase-adjusted carrier signal to the signal capture circuit antenna to be provided to thereby effectively prevent data transfer between the RFID reader and the RFID transponder, the amplifier comprising one or more of the following: a single transistor, a multi-stage transistor circuit, and an operational amplifier.

24. A device as defined in claim 12, wherein the signal capture circuit comprises:
- a signal capture circuit antenna assembly including a signal capture circuit antenna positioned to receive an interrogation signal from the RFID reader when the signal capture circuit is positioned in close proximity to the RFID transponder and when the RFID reader is producing the interrogation signal of sufficient strength to interrogate the RFID transponder, the interrogation signal comprising a modulated interrogation carrier signal carrying a data signal, the signal capture circuit antenna assembly being not tuned to prevent operational activation affecting the RFID reader when not employed to protect an RFID transponder;
- a timing synchronizer positioned to return a modulated carrier signal synchronized with the interrogation signal responsive to the interrogation signal;
- a data separator positioned to separate the data signal from the interrogation signal to provide the timing synchronizer a reference to the interrogation carrier signal;
- a data detector positioned to provide the data signal to the timing synchronizer to facilitate data modulation of the synchronized carrier signal by the timing synchronizer, the data modulated signal including a different data signal than the data signal included in the interrogation signal, the data modulation comprising one or more of the following: frequency-based data modulation, phase-based data modulation, and amplitude-based data modulation;
- a voltage rectifier positioned to provide operational signal capture circuit power responsive to the interrogation signal when the RFID signal capture device is positioned in close proximity to the RFID transponder and when the RFID reader is producing the interrogation signal of sufficient strength to interrogate the RFID transponder; and
- an amplifier positioned to receive the modulated carrier signal from the timing synchronizer to provide the data modulated carrier signal to the signal capture circuit antenna to be provided to thereby effectively prevent data transfer between the RFID reader and the RFID transponder, the amplifier comprising one or more of the following: a single transistor, a multi-stage transistor circuit, and an operational amplifier.

25. A device as defined in claim 24, wherein the RFID signal capture device does not include a battery to power the signal capture circuit.

26. A device as defined in claim 12, wherein the signal capture circuit comprises:
- an antenna array having a plurality of antennas positioned to receive an interrogation signal from the RFID reader when the signal capture circuit is positioned in close proximity to the RFID transponder and when the RFID reader is producing the interrogation signal of sufficient strength to interrogate the RFID transponder, the interrogation signal comprising a modulated interrogation carrier signal carrying a data signal; and
- an application specific integrated circuit (ASIC) positioned to interface and respond to the interrogation signal received by the antenna array to thereby effectively prevent data transfer between the RFID reader and the RFID transponder, the ASIC providing digital sampling to detect the data signal received from the RFID reader.

27. A device as defined in claim 12, wherein the signal capture circuit comprises:
- an antenna array having a plurality of antennas positioned to receive an interrogation signal from the RFID reader, the interrogation signal comprising a modulated interrogation carrier signal carrying a data signal;
- a plurality of inverters positioned to demodulate the interrogation signal and to provide to the plurality of antennas, a signal having a same data rate as the interrogation signal to thereby effectively prevent data transfer between the RFID reader and the RFID transponder; and
- a voltage rectifier positioned to provide operational power to the plurality of inverters responsive to the interrogation signal when the RFID signal capture device is positioned in close proximity to the RFID transponder and when the RFID reader is producing the interrogation signal of sufficient strength to interrogate the RFID transponder.

28. A device as defined in claim 12, wherein the signal capture circuit comprises:
- a receiver antenna positioned to receive an interrogation signal from the RFID reader, the interrogation signal comprising a modulated interrogation carrier signal carrying a data signal
- a demodulator operably coupled to the receiver antenna to demodulate the received interrogation signal;
- a frequency generator positioned to generate a disruptive transmission signal having a center frequency above and below that of the interrogation carrier signal;
- a transmitter antenna;
- a transmitter power level controller operably coupled to the frequency generator and to the transmitter antenna to provide the disruptive transmission signal to the transmitter antenna for transmission to thereby effectively prevent data transfer between the RFID reader and the RFID transponder; and
- a power generator operably coupled to the demodulator to receive supply power and positioned to provide power to the frequency generator and the transmitter power level controller responsive to the interrogation signal when the RFID signal capture device is positioned in close proximity to the RFID transponder and when the RFID reader is producing the interrogation signal of sufficient strength to interrogate the RFID transponder.

29. A radio frequency identification (RFID) signal capture device to prevent data transfer between a nearby RFID reader and an RFID device including an RFID transponder storing data and configured to inductively couple with the RFID reader to provide data thereto when interrogated therewith, the RFID signal capture device comprising:
- a container; and
- a signal capture circuit carried by the container and configured to mutually inductively couple with the RFID transponder when positioned in close proximity thereto and when the RFID reader is producing an interrogation signal of sufficient strength to interrogate the RFID transponder and to prevent data transfer between the RFID transponder and the RFID reader responsive to being positioned in close proximity to the RFID transponder and responsive to the RFID reader producing an interrogation signal of sufficient strength to interrogate the RFID transponder, the signal capture circuit comprising:
- a signal capture circuit antenna assembly including a signal capture circuit antenna positioned to receive an interrogation signal from the RFID reader when the signal capture circuit is positioned in close proximity to the RFID transponder and when the RFID reader is producing the interrogation signal of sufficient strength RFID transponder, the interrogation signal comprising a modulated interrogation carrier signal carrying a data signal;
- a timing synchronizer positioned to return a phase-adjusted carrier signal responsive to the interrogation signal;
- a data separator positioned to separate the data signal from the interrogation signal to provide the timing synchronizer a reference to the interrogation carrier signal to facilitate the phase adjustment;
- a data detector positioned to provide the data signal to the timing synchronizer and positioned to facilitate data modulation of the phase-adjusted carrier signal, the data modulated phase-adjusted signal having a different data signal than the data signal included in the interrogation signal, the data modulation comprising one or more of the following: frequency-based data modulation, phase-based data modulation, and amplitude-based data modulation;
- a voltage rectifier positioned to provide operational signal capture circuit power responsive to the interrogation signal when the RFID signal capture device is positioned in close proximity to the RFID transponder and when the RFID reader is producing the interrogation signal of sufficient strength to interrogate the RFID transponder; and
- an amplifier positioned to receive the phase-adjusted carrier signal from the timing synchronizer to provide the phase-adjusted carrier signal to the signal capture circuit antenna to be provided to thereby effectively prevent data transfer between the RFID reader and the RFID transponder, the amplifier comprising one or more of the following: a single transistor, a multi-stage transistor circuit, and an operational amplifier.

30. A device as defined in claim 29, wherein the RFID signal capture device further comprises:
- an interrogation indicator carried by the container and configured to indicate to a user of the RFID device that the RFID reader is attempting to interrogate the RFID transponder when the RFID signal capture device is positioned in close proximity thereto and when the RFID reader is producing an interrogation signal of sufficient strength to interrogate the RFID transponder.

31. A device as defined in claim 29,
- wherein the phase-shifted carrier signal returned by the timing synchronizer has a phase shift of at least approximately 90 degrees to that of the interrogation carrier signal to thereby effectively prevent the data transfer between the RFID reader and the RFID transponder; and
- wherein the RFID signal capture device does not include a battery to power the signal capture circuit.

32. A device as defined in claim 29, wherein the signal capture circuit antenna comprises an un-tuned signal capture circuit antenna to mutually inductively couple with both the RFID reader and at least one of a plurality of RFID transponders responsive to being positioned in close proximity thereto and responsive to the RFID reader producing an interrogation signal of sufficient strength to interrogate the at least one of the plurality of RFID transponders to disrupt an interrogation response field associated with the at least one of the plurality of transponders to thereby effectively prevent data transfer between each of the plurality of RFID transponders and the RFID reader, the plurality of RFID transponders each positioned in close proximity to the un-tuned signal capture circuit antenna of the signal capture circuit when the RFID signal capture device is operably positioned to protect the plurality of RFID transponders so that the un-tuned signal capture circuit antenna is within an interrogation response field range of each of the plurality of RFID transponders.

33. A method of preventing data transfer between a nearby RFID reader and one or more RFID transponders including data to be protected, the method comprising the steps of:
- inductively coupling an RFID signal capture device with the one or more RFID transponders to thereby effectively prevent data transfer between the one or more RFID transponders and the nearby RFID reader when the RFID signal capture device is positioned by a user in close proximity to the one or more RFID transponders, when the RFID reader is producing an interrogation signal of sufficient strength to interrogate the one or more RFID transponders, and when the one or more RFID transponders is producing a reply to the interrogation signal responsive to an interrogation by the RFID reader, the RFID signal capture device being separate from but positioned by the user adjacent to the RFID transponder so that the RFID signal capture device is positioned within an interrogation response field range of the one or more of RFID transponders;

indicating to the user of the one or more RFID transponders that the RFID reader is attempting to interrogate the one or more RFID transponders when the RFID reader is producing the interrogation signal and when the RFID signal capture device is in close proximity to the one or more RFID transponders; and selectively substantially separating the RFID signal capture device from being adjacent the one or more RFID transponders to allow authorized interrogation of the one or more RFID transponders, the RFID signal capture device being configured to not interfere with operation of the RFID reader when the RFID signal capture device is not positioned in close proximity to the one or more RFID transponders.

34. A method as defined in claim 33, wherein the step of indicating to the user of the one or more RFID transponders that the RFID reader is attempting to interrogate the RFID transponder includes one or more of the following steps:

illuminating a visual indicator carried by the RFID signal capture device; and sounding an audible indicator carried by the RFID signal capture device.

35. A method as defined in claim 33, further comprising the step of:

inductively coupling the RFID signal capture device with the RFID reader when positioned in close proximity to the one or more RFID transponders and when the RFID reader is producing an interrogation signal to thereby effectively prevent data transfer between the one or more RFID transponders and the RFID reader, the RFID signal capture device configured to include an un-tuned antenna so that when the RFID signal capture device is not positioned in close proximity to an RFID transponder, the RFID signal capture device will not inductively couple with the RFID reader to thereby selectively prevent interference with operation of the RFID reader.

36. A method as defined in claim 33, further comprising the step of:

inductively coupling the RFID signal capture device with at least one of the one or more RFID transponders when positioned in close proximity thereto and when the at least one of the one or more RFID transponders is producing a reply to interrogation signal to thereby effectively prevent data transfer between the one or more RFID transponders and the RFID reader, the RFID signal capture device configured to include an un-tuned antenna so that when the RFID signal capture device is not positioned in close proximity to the one or more RFID transponders, the RFID signal capture device will not inductively couple with either of the following: the RFID reader and the one or more RFID transponders.

37. A method as defined in claim 33, wherein the one or more RFID transponders comprises a plurality of RFID transponders each positioned in close proximity to an un-tuned signal capture circuit antenna of the signal capture circuit when the RFID signal capture device is operably positioned to protect the plurality of RFID transponders so that the un-tuned signal capture circuit antenna is within an interrogation response field range of each of the plurality of RFID transponders; and wherein the method further comprises the step of inductively coupling the RFID signal capture device with both the RFID reader and at least one of the plurality of RFID transponders responsive to being positioned in close proximity to the at least one of the plurality of RFID transponders and responsive to the RFID reader producing an interrogation signal of sufficient strength to interrogate the at least one of the plurality of RFID transponders to disrupt an at least one interrogation response field associated with the at least one of the plurality of transponders to thereby effectively prevent data transfer between the RFID reader and each of the plurality of RFID transponders.

38. A method as defined in claim 33, further comprising the step of:

indicating to the user of the one or more RFID transponders that the RFID reader and the one or more RFID transponders are transferring data therebetween when the RFID reader is producing an interrogation signal of sufficient strength to interrogate the one or more RFID transponders and when the RFID signal capture device is in close proximity to the RFID reader and not in close proximity to the one or more RFID transponders.

39. A method as defined in claim 38, wherein the data transfer indication includes one or more of the following: a visual indication and an audible indication, being distinctive from that provided when the interrogation signal of sufficient strength to interrogate the one or more RFID transponders is being transmitted but no data is being transferred between the RFID reader and the one or more RFID transponders.

* * * * *

UNITED STATES PATENT AND TRADEMARK OFFICE
CERTIFICATE OF CORRECTION

| | |
|---|---|
| PATENT NO. | : 8,102,243 B2 |
| APPLICATION NO. | : 12/406744 |
| DATED | : January 24, 2012 |
| INVENTOR(S) | : Horne et al. |

It is certified that error appears in the above-identified patent and that said Letters Patent is hereby corrected as shown below:

Title page, item (57) Abstract, Lines 7 to 8, please replace "indic-tor" with "indicator";

Specification, Column 3, Line 50, please replace "REID" with "RFID";

Specification, Column 6, Line 63, please replace "bad" with "had";

Specification, Column 8, Line 50, please replace "REID" with "RFID";

Specification, Column 16, Line 47, please replace "1113" with "113";

Specification, Column 16, Line 60, please replace "disrupter" with "disruptor";

Specification, Column 21, Line 28, please replace "REID" with "RFID";

Claims, Column 24, Lines 51 to 52, please replace "cap-tured" with "capture"; and Claims, Column 29, Line 52, please replace "sufficient strength RFID" with "sufficient strength to interrogate the RFID".

Signed and Sealed this
Twenty-ninth Day of May, 2012

David J. Kappos
*Director of the United States Patent and Trademark Office*